US010738255B2

(12) United States Patent
White

(10) Patent No.: US 10,738,255 B2
(45) Date of Patent: *Aug. 11, 2020

(54) PROCESS FOR FORMING A SOLID FUEL COMPOSITION FROM MIXED SOLID WASTE

(71) Applicant: EcoGensus LLC, Hartford, CT (US)

(72) Inventor: Bjornulf White, Hartford, CT (US)

(73) Assignee: Ecogensus LLC, Hartford, CT (US)

(*) Notice: Subject to any disclaimer, the term of this patent is extended or adjusted under 35 U.S.C. 154(b) by 727 days.

This patent is subject to a terminal disclaimer.

(21) Appl. No.: 14/929,086

(22) Filed: Oct. 30, 2015

(65) Prior Publication Data
US 2016/0122674 A1 May 5, 2016

Related U.S. Application Data

(60) Provisional application No. 62/072,822, filed on Oct. 30, 2014.

(51) Int. Cl.
C10L 5/40 (2006.01)
C08J 11/06 (2006.01)
(Continued)

(52) U.S. Cl.
CPC ............ C10L 5/406 (2013.01); C08J 11/06 (2013.01); C10B 27/06 (2013.01); C10B 47/44 (2013.01); C10B 53/07 (2013.01); C10L 5/363 (2013.01); C10L 5/445 (2013.01); C10L 5/46 (2013.01); C02F 1/283 (2013.01); C02F 1/44 (2013.01); C02F 1/78 (2013.01); C08J 2300/30 (2013.01); C10L 2290/06 (2013.01); C10L 2290/08 (2013.01); C10L 2290/24 (2013.01); C10L 2290/28 (2013.01); C10L 2290/46 (2013.01);
(Continued)

(58) Field of Classification Search
CPC ............ C10L 2290/30; C10L 2290/46; C10L 2290/50
See application file for complete search history.

(56) References Cited

U.S. PATENT DOCUMENTS 2,760,936 A 8/1956 Baker
3,742,613 A 7/1973 Von Gimborn
(Continued)

FOREIGN PATENT DOCUMENTS

CN 1810865 8/2006
CN 102076833 5/2011
(Continued)

OTHER PUBLICATIONS

International Search Report and Written Opinion from corresponding PCT Application No. PCT/US2015/058508, dated Jan. 15, 2016, pp. 1-14.
(Continued)

Primary Examiner — Ellen M McAvoy
Assistant Examiner — Ming Cheung Po
(74) Attorney, Agent, or Firm — Fish & Richardson P.C.

(57) ABSTRACT

Systems and methods of producing a solid fuel composition are disclosed. In particular, systems and methods for producing a solid fuel composition by heating and mixing a solid waste mixture below atmospheric pressure to a maximum temperature sufficient to melt the mixed plastics within the solid waste mixture is disclosed.

30 Claims, 7 Drawing Sheets

(51) Int. Cl.

| | | |
|---|---|---|
| *C10L 5/46* | (2006.01) | |
| *C10L 5/44* | (2006.01) | |
| *C10L 5/36* | (2006.01) | |
| *C10B 53/07* | (2006.01) | |
| *C10B 27/06* | (2006.01) | |
| *C10B 47/44* | (2006.01) | |
| *C02F 1/28* | (2006.01) | |
| *C02F 1/78* | (2006.01) | |
| *C02F 1/44* | (2006.01) | |

(52) U.S. Cl.
CPC ..... *C10L 2290/544* (2013.01); *C10L 2290/56* (2013.01); *C10L 2290/58* (2013.01); *C10L 2290/60* (2013.01); *Y02E 50/10* (2013.01); *Y02E 50/30* (2013.01)

(56) References Cited

U.S. PATENT DOCUMENTS

| | | | |
|---|---|---|---|
| 4,176,969 A | 12/1979 | Wallace et al. | |
| 4,298,350 A | 11/1981 | Bauer | |
| 4,541,277 A | 9/1985 | Starnes, Jr. | |
| 4,636,085 A | 1/1987 | Kopernicky | |
| 4,752,139 A | 6/1988 | Hauck | |
| 5,161,888 A | 11/1992 | Hauck | |
| 5,265,979 A | 11/1993 | Hansen | |
| 5,345,955 A | 9/1994 | Clearman et al. | |
| 5,429,645 A | 7/1995 | Benson | |
| 5,759,238 A | 6/1998 | Yanagimachi et al. | |
| 5,888,256 A | 3/1999 | Morrison | |
| 5,938,994 A | 8/1999 | English | |
| 6,126,842 A | 10/2000 | Decker | |
| 6,139,793 A * | 10/2000 | Vanderwal | A61L 11/00 422/1 |
| 6,165,238 A | 12/2000 | Parkinson et al. | |
| 6,692,544 B1 | 2/2004 | Grillenzoni | |
| 7,252,691 B2 | 8/2007 | Philipson | |
| 8,157,874 B2 | 4/2012 | Bohlig et al. | |
| 8,157,875 B2 | 4/2012 | Bohlig et al. | |
| 8,192,512 B2 | 6/2012 | Bohlig et al. | |
| 8,192,513 B2 | 6/2012 | Bohlig et al. | |
| 8,349,034 B2 | 1/2013 | Calabrese et al. | |
| 8,377,153 B2 * | 2/2013 | Kluko | C10L 5/44 44/553 |
| 8,382,862 B2 | 2/2013 | Bohlig et al. | |
| 8,382,863 B2 | 2/2013 | Bohlig et al. | |
| 8,444,721 B2 | 5/2013 | Bai | |
| 8,459,581 B2 | 6/2013 | Bai | |
| 8,523,962 B2 | 9/2013 | Bohlig et al. | |
| 8,579,997 B2 | 11/2013 | Bai | |
| 8,585,787 B2 | 11/2013 | Bai et al. | |
| 8,617,264 B2 | 12/2013 | Bohlig et al. | |
| 8,636,235 B2 | 1/2014 | Bai | |
| 8,721,746 B2 | 5/2014 | Kiyama | |
| 8,746,599 B2 | 6/2014 | Bai | |
| 8,828,105 B2 * | 9/2014 | Calabrese | C10J 3/482 44/605 |
| 8,852,302 B2 | 10/2014 | Bai | |
| 8,906,119 B2 | 12/2014 | Bohlig et al. | |
| 8,915,199 B2 | 12/2014 | Bohlig et al. | |
| 8,999,014 B2 * | 4/2015 | Bai | C10L 5/406 44/589 |
| 9,062,268 B2 | 6/2015 | Bai | |
| 9,162,231 B2 | 10/2015 | Bai | |
| 9,181,508 B2 | 11/2015 | Bohlig et al. | |
| 9,217,188 B2 | 12/2015 | Bohlig et al. | |
| 9,487,722 B2 | 11/2016 | Bai et al. | |
| 9,523,051 B2 | 12/2016 | Bai et al. | |
| 9,771,536 B2 | 9/2017 | White | |
| 2005/0154114 A1 | 7/2005 | Hale | |
| 2008/0014112 A1 * | 1/2008 | Lee | C10L 5/46 422/26 |
| 2008/0210089 A1 | 9/2008 | Tsangaris | |
| 2009/0056205 A1 | 3/2009 | Gauthier et al. | |
| 2009/0154114 A1 | 6/2009 | Peng et al. | |
| 2009/0320358 A1 * | 12/2009 | Kobayashi | B30B 11/221 44/590 |
| 2010/0031560 A1 | 2/2010 | Calabrese et al. | |
| 2010/0261895 A1 | 10/2010 | Noll et al. | |
| 2011/0272858 A1 * | 11/2011 | Tamir | B09B 3/0025 264/319 |
| 2012/0065440 A1 | 3/2012 | Fraczak et al. | |
| 2012/0279115 A1 | 11/2012 | Ruiters | |
| 2013/0055630 A1 | 3/2013 | Bohlig | |
| 2013/0097921 A1 | 4/2013 | Calabrese et al. | |
| 2013/0192127 A1 | 8/2013 | Rhatigan | |
| 2013/0240343 A1 | 9/2013 | Wolfe | |
| 2013/0298455 A1 | 11/2013 | Bai | |
| 2014/0096441 A1 | 4/2014 | Bai | |
| 2015/0368563 A1 | 12/2015 | Funk | |
| 2016/0122672 A1 | 5/2016 | White | |
| 2016/0122673 A1 | 5/2016 | White | |
| 2018/0002624 A1 | 1/2018 | White | |

FOREIGN PATENT DOCUMENTS

| | | |
|---|---|---|
| CN | 102089412 | 6/2011 |
| CN | 102348514 | 2/2012 |
| EP | 2090641 | 8/2009 |
| EP | 2127738 | 12/2009 |
| EP | 2314662 | 4/2011 |
| JP | 2000-273460 | 10/2000 |
| JP | 2010-018725 | 12/2010 |
| JP | 2011-526324 | 10/2011 |
| JP | 2012-515080 | 7/2012 |
| TW | 200604288 | 2/2006 |
| WO | 2005/105291 | 11/2005 |
| WO | WO2006041439 | 4/2006 |
| WO | WO2007/145507 | 12/2007 |
| WO | WO2008/012951 | 1/2008 |
| WO | WO2010/013202 | 2/2010 |
| WO | WO 2010082202 | 7/2010 |

OTHER PUBLICATIONS

Evaluation of the Ames Solid Waste Recovery System, Part I, Summary of Environmental Emissions: Equipment, Facilities, and Economic Evaluations, EPA-600/2-77-205, Nov. 1977.

Evaluation of the Performance of the Disc Screens Installed at the City of Ames, Iowa Resource Recovery Facility, Proc. ASME National Solid Waste Processing Conf., Washington, DC, 1980.

Study of Existing RDF-Cofiring Experience, vol. 3: Phase II Final Report, ANL/CNSV-TM-134, vol. 3, Oct. 31, 1983.

Refuse Derived Fuel, Current Practice and Perspectives (B4-3040/2000/306517/MAR/E3) Final Report No. CO 5087-4, Jul. 2003.

Garg, Anurag, et al., Wastes as Co-Fuels: The Policy Framework for Solid Recovered Fuel (SRF) in Europe, with UK Implications, Environ. Science & Tech. 41.14 (2007).

Raghunathan, K., et al., Prevention of PCDD/PCDF Formation by Coal Co-Firing, U.S. Environmental Protection Agency, Air Pollution Prevention and Control Division (1998).

Canova, Joseph H., Testing and Evaluating the Combustion Characteristics of Waste Fuels (1992).

Keith J. Fritsky, et al., Methodology for Modeling the Devolatilization of Refuse-Derived Fuel from Thermogravimetric Analysis of Municipal Solid Waste Components, J. Air & Waste Manage. Assoc. 44:9 (1994).

International Search Report and Written Opinion issued in Application No. PCT/US2015/058497, dated Jan. 15, 2016.

Supplementary European Search Report issued in Application No. PCT/US2015/058503, dated Mar. 8, 2018.

Yu Jie et al., "Thermal degradation of PVC: A review", Waste Management, vol. 48, pp. 300-314, Dec. 10, 2015.

Supplementary European Search Report issued in Application No. PCT/US2015/058508, dated Mar. 7, 2018.

International Search Report issued in Application No. PCT/IB2009/053281, dated Nov. 25, 2009.

BR Office Action in Brazilian Appln. No. BR112017009043-0, dated Sep. 6, 2019, 6 pages (with English translation).

(56) References Cited

OTHER PUBLICATIONS

CN Office Action in Chinese Appln. No. 201580070816.4, dated Aug. 27, 2019, 22 pages (with English translation).
JP Office Action in Japanese Appln. No. 2017-542812, dated Sep. 17, 2019, 7 pages (with English translation).
Paul et al., "Handbook of Industrial Mixing: Science and Practice," 2004, 1432 pages.
PH Office Action in Filipino Application No. 1/2017/500812, dated Jan. 28, 2020, 7 pages.

* cited by examiner

PROCESS FOR FORMING A SOLID FUEL COMPOSITION FROM MIXED SOLID WASTE

CROSS-REFERENCE

This disclosure claims benefit of the filing date under 35 U.S.C. § 119 to U.S. Provisional Patent Application Ser. No. 62/072,822 filed Oct. 30, 2014, and entitled "Process for Forming a Solid Block Composition From Mixed Solid Waste," the disclosure of which is herein incorporated by reference in its entirety for all purposes.

TECHNICAL FIELD

The present disclosure relates to methods of processing mixed solid wastes. More specifically, the present disclosure relates to methods for producing a solid fuel composition from a solid waste mixture, especially without the formation of syngas.

BACKGROUND

The management of solid wastes such as municipal wastes from residential, institutional, and commercial sources, agricultural wastes, and other wastes such as sewage sludge, remains a challenging issue with ever-evolving solutions. As landfills reach and exceed capacity worldwide, and as the solid waste industry and societies generally limit the use of landfills, alternative methods of managing solid wastes have been developed that additionally process the solid wastes to reduce the volume introduced into landfills. Recycling of metals, plastics, and paper products, as well as composting organic matter are relatively common methods of reducing the overall volume of solid wastes going to landfills. Waste-to-Energy processes have also been developed to convert the energetic content of solid wastes into a more usable form such as electrical power.

A variety of Waste-to-Energy processes may use thermal treatments such as incineration, pyrolysis, or gasification to release the energy content of the solid waste stream, which is subsequently used to drive downstream electrical generators. Although pyrolysis and gasification afford many advantages over incineration in Waste-to-Energy processes, the effective use of pyrolysis or gasification is limited when municipal solid waste (MSW) or agricultural waste is used as the feedstock, due to the high water content, low density, and lack of homogeneity.

Efficient operation of a pyrolysis or a gasification chamber typically uses feedstock that is high density and of consistent composition with essentially no moisture. Because solid waste streams are inherently low density and variable in composition, most Waste-to-Energy plants incinerate the solid waste stream to liberate the energy of the solid waste stream. Enhanced pyrolysis mechanisms, such as advanced gasification, may overcome inefficiencies associated with the inherent inconsistency of solid waste composition, but these advanced mechanisms require significant investment in specialized equipment. Further, they are still limited by the quality of the feedstock.

Other processes use pelletizers to render the solid waste stream of the pyrolysis chamber more uniform in size. But the pelletized solid waste retains the variation in composition inherent in solid waste streams. Further, pelletizing the solid waste stream fails to transform the solid waste into a high density and low moisture fuel appropriate for the efficient operation of a pyrolysis (or gasification) chamber.

A need exists for a solid fuel composition and a process of producing a solid fuel composition from a solid waste stream that may include mixed solid wastes and other wastes to be used as a feedstock. Such a fuel would provide efficient operation of a pyrolysis (or gasification) chamber as part of a Waste-to-Energy process, without additional capital investment in advanced machinery. In addition, a need exists for a process that transforms a solid waste stream with variable composition into a solid fuel composition with a relatively consistent composition that is high density and low moisture, as this provides a better fuel composition. Further, a need exists for a process for forming a solid fuel composition from a solid waste stream that may further eliminate odors, bacteria, and other undesired properties of the solid waste stream used to produce the solid fuel composition. The solid fuel composition resulting from such a process may enable the use of high-efficiency pyrolysis or gasification methods as part of a Waste-to-Energy process by providing a homogenized, dry, dense, and energy rich fuel primed for pyrolysis or gasification.

BRIEF SUMMARY

The methods disclosed herein process solid waste mixtures without extensive presorting or predrying, as typically employed for producing an engineered fuel. Because the source material need not be dried or presorted (other than the optional removal non-combustibles of metal, glass, and hazardous materials), variations of content based on the site of origin, the season, or the weather do not substantially affect the process.

The process starts by obtaining a solid waste mixture which includes organic material, trash, and plastic. The system processes the solid waste mixture in a process vessel below atmospheric pressure, driving away excess moisture, volatile organic compounds (VOCs), chlorinated organics, and chlorine gas, which are sequestered without exposure of these gasses to the atmosphere. Then heat increases after removal of the water and VOCs to melt mixed plastics in the solid waste mixture. This process melts plastics content within the dried solid waste mixture, thereby distributing the plastic throughout the solid fuel composition and increasing the density of the solid fuel composition, in contrast to existing compositions. The finished product has not been pyrolyzed and includes organic compounds and plastic. The finished product is of a general uniform consistency, meaning that large pieces within the solid waste mixture are reduced to an average particle size equal to or less than other individual pieces within the solid waste mixture. The finished product also has low water content (<1% wt.), and is suitable for a variety of post process applications, including use as fuel for incineration, or as syngas feedstock, for example via pyrolysis or gasification.

Briefly, therefore the present disclosure encompasses a method for producing a solid fuel composition without syngas formation with an energy content of at least 8,000 BTU/lb. from a solid waste mixture. The method includes heating a solid waste mixture that includes at least 5% wt. mixed plastics within a process vessel to a temperature no greater than 110° C. (such as about 100° C., or between about 90° C. and about 110° C.) to separate the solid waste mixture into a dried solid waste mixture and vaporized compounds released from the heated solid waste mixture.

The vaporized compounds may include any one or more of water vapor, at least one volatile organic compound, chlorinated organic compound, chlorine gas, and any combination thereof. The method may also include removing the vaporized compounds from the process vessel by reducing the pressure within the process vessel to less than about 50 torr using a vacuum system attached at the vacuum port; heating and mixing the dried solid waste mixture to a maximum temperature of at least 160° C. to form a heated solid waste mixture comprising melted mixed plastics; extruding the heated solid waste mixture from the process vessel using the extrusion outlet; and cooling the extruded mixture to less than about 65° C. to form the solid fuel composition. The solid waste mixture may include from about 20% wt. to about 40% wt. mixed plastics. Alternatively, the solid waste mixture may include from about 5% wt. to about 35% wt. mixed plastics.

The solid waste mixture comprises municipal solid waste and agricultural waste. The method may further comprise analyzing the solid waste mixture for non-combustible solid waste and, if present, removing the non-combustible solid waste. Ultimately, the feedstock must be substantially free of non-combustible metallic wastes. The method may further comprise analyzing the solid waste mixture for a mixed plastics content and, if necessary, adjusting the amount of mixed plastics in the solid waste mixture to between about 5% wt. and about 60% wt.

The mixed plastics may comprise one or more plastics selected from the group consisting of polyester, polyethylene terephthalate, polyethylene, polyvinyl chloride, polyvinylidene chloride, polypropylene, polystyrene, polyamides, acrylonitrile butadiene styrene, polyethylene/acrylonitrile butadiene styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethyl methacrylate, polytetrafluoroethylene, and urea-formaldehyde. In particular, the mixed plastics may comprise polyvinyl chloride, polyvinylidene chloride, and combinations thereof, and the dried solid waste is heated to at least about 190° C.

More specifically, the solid waste mixture may include from about 20% wt. to about 40% wt. mixed plastics. Alternatively, the solid waste mixture may include from about 5% wt. to about 35% wt. mixed plastics. The resultant solid fuel composition may be a hydrophobic, stable, and non-biodegradable material. The material may include from about 40% wt. to about 80% wt. carbon; from about 5% wt. to about 20% wt. hydrogen; from about 5% wt. to about 20% wt. oxygen; less than about 2% wt. sulfur; less than about 2% wt. chlorine; and less than about 1% wt. water. The resultant solid fuel composition may have an energy content of at least 8,000 BTU/lb. The resultant solid fuel composition may be substantially free of volatile organic compounds.

The process vessel may include one or more heated walls maintained at a wall temperature of at least about 190° C., a mixer in the interior volume of the process vessel and operatively connected to the process vessel, an extruding element passing through a first opening in the process vessel, and a vacuum port passing through a second opening in the process vessel; wherein the process vessel is attached via the vacuum port to a vacuum system comprising a vacuum pump. Typically, the vaporized compounds include any of the following: water vapor, volatile organic compounds, chlorinated organic compounds, chlorine gas, and any combination thereof.

The method may further include shredding the solid waste mixture into pieces with a maximum dimension or diameter of about two inches prior to introducing the solid waste mixture into the process vessel. The method may further include condensing the vaporized compounds removed from the process vessel to produce wastewater comprising one or more selected from the group consisting of at least one volatile organic compound, chlorinated organic compounds, chlorine gas, and any combination thereof dissolved in a condensed water vapor. The method may further include removing the one or more volatile organic compounds, chlorinated organic compounds, chlorine gas, and any combination thereof from the wastewater to produce treated wastewater. Chlorine gas, chlorinated organic compounds, and volatile organic compounds are environmental pollutants subject to government regulation. Trapping and removing these compounds via the wastewater reduces the volume of these compounds, which would otherwise escape into the atmosphere.

The wall temperature may be maintained from about 190° C. to about 280° C. and the maximum temperature of the solid waste mixture may range from about 160° C. to about 250° C. to separate the dried solid waste mixture from the vaporized compounds. Preferably the wall temperature is maintained at about 280° C. and the solid waste mixture is heated to about 250° C. to soften and disperse the mixed plastics within the heated solid waste mixture. The method may further include monitoring the wall temperature of the one or more heated walls and using the monitored wall temperature to modulate operation of a heater operatively coupled to the one or more heated walls to automatically maintain the one or more heated walls at a desired wall temperature. The method may further include monitoring a headspace pressure within a headspace volume within the process vessel and using the monitored headspace pressure to modulate operation of the vacuum system to automatically maintain the reduced pressure within the process vessel.

The method may further include monitoring moisture content within the vaporized compounds removed from the process vessel. An initial increase in the moisture content may indicate that the solid waste mixture is sufficiently heated to release water vapor and a subsequent decrease to a stable minimum moisture level may indicate that the solid waste mixture may include less than about 2% wt. water, such as less than about 1% wt. water.

The method may further include monitoring the mixture temperature within the solid waste mixture within the process vessel. Typically, the monitored mixture temperature equal to the predetermined temperature may indicate that the solid waste mixture is ready for extrusion from the process vessel. The method may further include monitoring a weight of the solid waste mixture within the process vessel. A decrease in the monitored weight to a minimum weight may indicate that the vaporized compounds may be fully removed from the solid waste mixture. The solid waste mixture may be heated and mixed for a predetermined duration ranging from about 0.5 hours to about 2 hours. The method may further include cutting the extruded mixture into pieces during cooling.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The following figures illustrate various aspects of the disclosure.

Corresponding reference characters and labels indicate corresponding elements among the views of the drawings. The headings used in the figures should not be interpreted to limit the scope of the claims.

DETAILED DESCRIPTION

Figure 1:
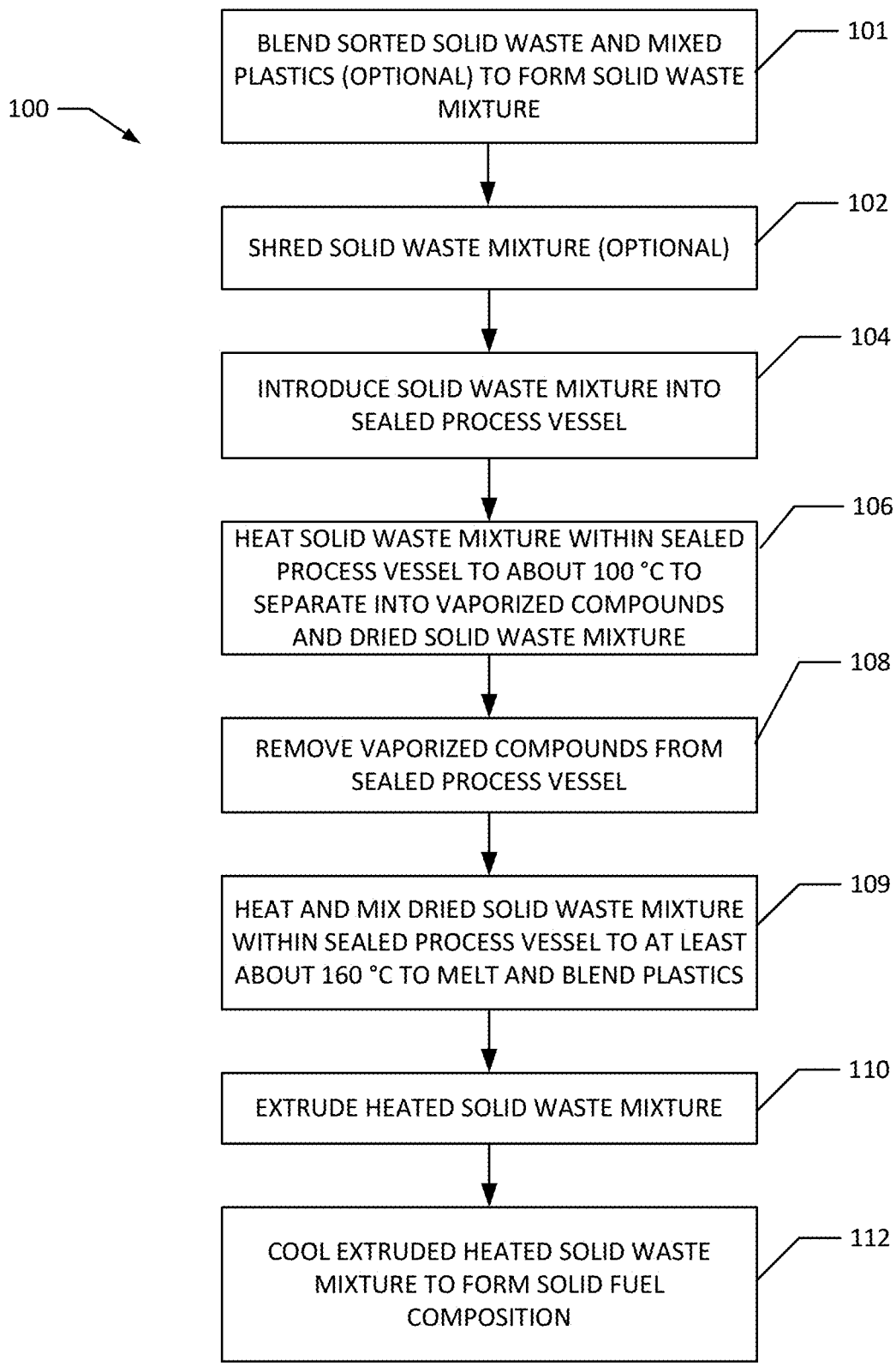
FIG. 1 is a flowchart illustrating a method of producing a solid fuel composition from a solid waste mixture.

The present disclosure encompasses methods and systems for producing a solid fuel composition without syngas formation with an energy content of at least 8,000 BTU/lb. Systems and methods for forming a solid fuel composition from a solid waste mixture that may include at least about 5% wt. plastics are provided herein below. The solid fuel composition may be formed by heating the solid waste mixture within a process vessel to a temperature of at least about 100° C. to separate the solid waste mixture into a dried solid waste mixture and vaporized compounds including, but not limited to, water vapor. The vaporized compounds may then be removed from the process vessel using an attached vacuum system, and the remaining dried solid waste mixture may then be mixed and heated to a maximum temperature of up to about 250° C. At the maximum temperature, any plastics within the solid waste mixture may be melted and distributed throughout the mixture. The heated solid waste mixture may then be extruded below about 200° C. and cooled to form the solid fuel mixture.

The resulting solid fuel mixture may have energy content of at least 8,000 BTU/lb. and a density of at least about 30 lb./ft$^3$. The solid fuel mixture may also be sterilized due to the high maximum temperature within the process vessel, and hydrophobic and non-porous by virtue of the plastics distributed throughout the solid fuel composition. As a result, the solid fuel mixture may be stored for extended periods at a wide variety of storage conditions without risk of biodegrading or otherwise altering the composition.

Detailed descriptions of method and systems for the solid fuel composition, as well as a description of the solid fuel composition itself, are provided herein below.

I. Method of Forming Solid Fuel Composition

A method for forming a solid fuel composition from a solid waste mixture is disclosed that includes heating and mechanically agitating a solid waste mixture within a process vessel to mix and homogenize the individual components of the solid waste. In addition, any vaporized compounds released by the heated solid waste mixture may be removed using a vacuum within the process vessel (i.e., at a pressure below atmospheric). The resulting contents of the process vessel may be extruded, formed into a desired shape, and cooled to form the solid fuel composition.

The method overcomes many of the limitations of previous Waste-to-Energy methods by transforming a solid waste mixture, which may be variable in composition, to a solid fuel composition with relatively low composition variability. In addition, the solid fuel composition produced by the method is essentially sterile and non-porous, enabling the solid fuel composition to be transported and stored for prolonged periods without need for specialized equipment or facilities. In addition, the solid fuel compositions are compatible with various pyrolysis processes associated with higher-yield Waste-to-Energy methods.

Some Waste-to-Energy processes incinerate the solid wastes, defined herein as burning the solid wastes in the presence of oxygen, thereby generating heat to produce steam that drives downstream steam generators. However, the incineration process also produces potentially harmful emissions that must either be scrubbed from the incinerator's exhaust stream or released to the environment. On the other hand, the present disclosure provides a solid fuel composition which has already had VOCs, chlorinated organic compounds, and chlorine gas removed, so that when the solid fuel composition incinerated or combusted, it does not emit these harmful pollutants into the environment and the exhaust stream need not be scrubbed for these compounds.

Other Waste-to-Energy processes use pyrolysis, which is the super-heating of the volatile components of an organic substance, created by heating the substance at a temperature ranging from about 400° F. to about 1,400° F. (about 205° C. to about 760° C.) in an oxygen-starved environment. Pyrolysis is a type of thermolysis, resulting in the irreversible thermochemical decomposition of organic material. Pyrolysis involves a simultaneous change of chemical composition and physical phase, where the feedstock is divided into ash, char (such as biochar), synoil (biooil), and syngas (biogas). Pyrolysis differs from combustion (oxidation), where the fuel reacts with oxygen, and hydrolysis, where the fuel reacts with water. The syngas and/or other fluids generated from pyrolysis enable the downstream efficient generators for power production, as opposed to the less efficient steam generators used in conjunction with incineration. The present disclosure provides a solid fuel composition that is not pyrolyzed, meaning that it has not been divided into ash, char, synoil, and syngas. Rather, the present solid fuel composition is a homogenized, dry, dense, and energy rich fuel primed for pyrolysis.

Gasification is similar to pyrolysis in that it involves heating organic substances in even higher temperature environments of about 900° F. to about 3,000° F. (about 480° C. to about 1,650° C.) with little to no oxygen. Gasification has the advantage of creating a greater amount of syngas, as some of the nonvolatile carbon char left from pyrolysis may also be converted to syngas via gasification. The present disclosure provides a solid fuel composition that is gasified, but which is a homogenized, dry, dense, and energy rich fuel primed for gasification.

The solid fuel composition disclosed herein can be used in any of the above process. The present solid waste mixture is chemically and physically transformed to provide a solid fuel composition especially suitable for pyrolysis, gasification and/or incineration. Without wishing to be bound by theory, pyrolysis typically cannot occur until a substantial portion of moisture is removed from the feedstock. The solid fuel compositions disclosed herein have a very low water content and can be immediately pyrolyzed. The solid fuel compositions have been processed to remove VOCs, chlorinated organic compounds, and chlorine gas. Generally, non-combustible waste materials have also been removed. The solid waste mixture is processed to the point just before pyrolysis occurs, in which the reaction is stopped by densifying and cooling the feedstock, thus keeping the gas that can be burned "locked" into the solid fuel composition. The resulting solid fuel composition primed for pyrolysis and related processes.

Blending of Solid Waste Mixture

FIG. 1 is a flowchart illustrating a method 100 to form a solid fuel composition from a solid waste mixture. Depending on the solid waste mixture subjected to the method 100, the solid waste mixture may optionally be formed by blending a sorted solid waste with mixed plastics at step 101. The feedstock for the process may be a solid waste mixture that includes at least about 20% wt. plastics. The feedstock for the process may be a solid waste mixture that includes at least about 5% wt. plastics.

"Waste" generally refers to carbon-containing combustible material that has been discarded after its primary use, including solid waste. Generally, the waste may be wet and heterogeneous, containing a portion of non-combustible waste. "Solid waste" refers to any garbage or refuse, sludge from a wastewater treatment plant, water supply treatment plant, or air pollution control facility and other discarded material, including solid, liquid, semi-solid, or contained gaseous material resulting from industrial, commercial, mining, and agricultural operations, and from community activities.

A variety of sources of solid waste can be used. The solid waste mixture may be derived from non-hazardous waste sources including, but not limited to, municipal waste, agricultural waste, sewage sludge, household waste, discarded secondary materials, and industrial solid waste. "Municipal waste," or "municipal solid waste" (MSW), as used herein, may refer to any household waste or commercial solid waste or industrial solid waste. Non-limiting examples of wastes that may be included in the solid waste mixture include biodegradable waste such as food and kitchen waste; green wastes such as lawn or hedge trimmings; paper; mixed plastics; solid food waste; solid agricultural waste; sewage sludge; and automotive shredder residue.

"Household waste" or "residential waste" refers to any solid waste (including garbage, trash, and sanitary waste in septic tanks) derived from households (including single and multiple residences, hotels and motels, bunkhouses, ranger stations, crew quarters, campgrounds, picnic grounds, and day-use recreation areas).

"Commercial solid waste" refers to all types of solid waste generated by stores, offices, restaurants, warehouses, and other nonmanufacturing activities, excluding residential and industrial wastes.

"Industrial solid waste" refers to non-hazardous solid waste generated by manufacture or industrial processes. Examples of industrial solid waste include, but are not limited to, waste resulting from the following manufacturing processes: Electric power generation; fertilizer/agricultural chemicals; food and related products/by-products; leather and leather products; organic chemicals; plastics and resins manufacturing; pulp and paper industry; rubber and miscellaneous plastic products; textile manufacturing; transportation equipment; and water treatment. This term does not include mining waste or oil and gas waste.

The solid waste mixture may comprise discarded non-hazardous secondary material, in which case solid fuel compositions produced from those solid waste mixtures may be legally categorized as "non-waste." "Secondary material" refers to any material that is not the primary product of a manufacturing or commercial process, and can include post-consumer material, off-specification commercial chemical products or manufacturing chemical intermediates, post-industrial material, and scrap. Examples of non-hazardous secondary materials include scrap tires that are not discarded and are managed by an established tire collection program, including tires removed from vehicles and off-specification tires; resinated wood; coal refuse that has been recovered from legacy piles and processed in the same manner as currently-generated coal refuse; and dewatered pulp and paper sludges that are not discarded and are generated and burned on-site by pulp and paper mills that burn a significant portion of such materials where such dewatered residuals are managed in a manner that preserves the meaningful heating value of the materials.

"Resinated wood" refers to wood products (containing binders and adhesives) produced by primary and secondary wood products manufacturing. Resinated wood includes residues from the manufacture and use of resinated wood, including materials such as board trim, sander dust, panel trim, and off-specification resinated wood products that do not meet a manufacturing quality or standard.

"Mixed plastics" refer to any combination of synthetic or semi-synthetic organics that are malleable and can be molded into solid objects of diverse shapes, and which are typically found in municipal solid waste. Suitable examples of mixed plastics include, but are not limited to, polyester (PES), polyethylene terephthalate (PET), polyethylene (PE), high-density polyethylene (HDPE), polyvinyl chloride (PVC), polyvinylidene chloride (PVDC, Saran™), low-density polyethylene (LDPE), polypropylene (PP), polystyrene (PS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), polyurethanes (PU), maleimide/bismaleimide, melamine formaldehyde (MF), phenol formaldehydes (PF), polyepoxide (Epoxy), polyetheretherketone (PEEK), polyetherimide (PEI, Ultem™), polyimide, polylactic acid (PLA), polymethyl methacrylate (PMMA, acrylic), polytetrafluoroethylene (PTFE), urea-formaldehyde (UF), and combinations thereof.

The mixed plastics may comprise one or more plastics selected from the group consisting of polyester, polyethylene terephthalate, polyethylene, polyvinyl chloride, polyvinylidene chloride, polypropylene, polystyrene, polyamides, acrylonitrile butadiene styrene, polyethylene/acrylonitrile butadiene styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethyl methacrylate, polytetrafluoroethylene, urea-formaldehyde, and combinations thereof.

The mixed plastics may comprise one or more plastics selected from the group consisting of polyester, polyethylene terephthalate, polyethylene, polyvinyl chloride, polyvinylidene chloride, polypropylene, polystyrene, polyamides, polycarbonate, polyurethanes, and combinations thereof. The mixed plastics may comprise polyethylene.

The mixed plastics may comprise polyvinyl chloride, polyvinylidene chloride, and combinations thereof, and the dried solid waste may be heated to at least about 190° C.

The solid waste mixture may be analyzed to detect non-combustible solid waste. Based on the analysis, a municipal solid waste stream may be lightly sorted to remove plastics, and to further exclude inert wastes including, but not limited to, glasses, metals, concrete, bricks, and any other inert material, resulting in a sorted solid waste. Inert material, as used herein, refers to any material not likely to release energy when subjected to a combustion or pyrolysis process. The plastics removed from the municipal solid waste stream may be retained and mixed with the sorted solid waste to form the solid waste mixture from which the solid fuel composition is formed. The non-combustible waste may comprise non-combustible metallic waste, including for example scrap metal and metals chunks. The non-combustible metallic waste may comprise ferrous metal, such as iron, steel, and other iron-containing alloys, and non-ferrous metal, which are metals and alloys which do not contain an appreciable amount of iron.

The solid waste mixture may be analyzed to determine the amount of mixed plastics present therein. The amount of mixed plastics present in the solid waste can and will vary. The solid waste mixture used as a feedstock to the process described herein may be formed by mixing sorted solid waste and plastics in a predetermined ratio based on the analysis. The mixed plastics are those typically found in the solid waste stream (e.g., MSW), used without further ratio adjustment (that is, sorting and remixing). The amount of mixed plastics affects the fuel compositions produced in the methods and systems described herein, and may be selected based on the economic model and/or on a project-by-project basis.

The solid waste mixture may include at least about 20% wt. mixed plastics. The solid waste mixture may include from about 20% wt. to about 60% wt. mixed plastics. The solid waste mixture may include from about 20% wt. to about 40% wt. mixed plastics. The feedstock for the process may include between about 5% wt. to about 35% wt. mixed plastics. The feedstock for the process may include between about 5% wt. to about 30% wt. mixed plastics. The feedstock for the process includes greater than about 5% wt. plastics.

The plastics may help bind together the solid fuel mixture resulting from the methods as described herein, and may further reduce the porosity and water activity of the solid fuel composition. In addition, the plastics in the solid fuel composition may influence the type of products resulting from pyrolysis processes using the solid fuel composition as a feedstock. Without being limited to any particular theory, solid fuel mixtures with a higher proportion of plastics are thought to produce higher yields of synoil using pyrolysis processes. Solid fuel mixtures with a lower proportion of plastics and a higher proportion of paper and cardboard are thought to produce higher yields of syngas using pyrolysis processes.

The solid waste mixture may have a highly variable composition due to the variable nature of municipal solid waste streams. A municipal solid waste stream may vary in composition due to a variety of factors including, but not limited to, different seasons, different locations within a country (urban versus rural), and/or different countries (industrial versus emerging).

The water contained within the solid waste mixture containing the sorted solid waste and the mixed plastics may vary and may influence the time and/or maximum temperature needed to remove the water from the solid waste mixture during the formation of the solid fuel composition using the methods described herein. To dry, a period of time may be selected that is sufficient to remove the water from the solid waste.

For example, the mixed solid waste may contain a variable amount of water ranging from about 10% wt. to about 60% wt. Specifically, the mixed solid waste may contain an amount of water ranging from between about 10% wt. and about 20% wt., the mixed solid waste may contain at least 10% wt. water, at least 20% wt. water, at least 30% wt. water, at least 40% wt. water, and at least 50% wt. water.

The available plastics may similarly vary. To form a mixture, the solid waste and the plastics may be individually weighed prior to mixing to ensure that the solid waste mixture is formed at the predetermined weight ratio of solid waste and plastics. The solid waste and plastics may each be transferred from a storage area to a mixing area using weighing devices including, but not limited to, a weighing conveyor that weighs the solid waste and plastics as they are combined to form the solid waste mixture. The plastics within the solid waste mixture may include plastics removed from the municipal waste stream during sorting, plastics obtained from outside sources, and any combination thereof.

Shredding of Solid Waste Mixture

Next, the solid waste mixture may be shredded to reduce particles to an average particle size equal to or less than other individual pieces within the solid waste mixture. Referring again to FIG. 1, the method may further include optionally shredding the solid waste mixture at step 102. Any known shredding device may be used to shred the solid waste mixture without limitation including, but not limited to, a single-shaft industrial shredder, a two-shaft industrial shredder, a three-shaft industrial shredder, a four-shaft industrial shredder, a hammer mill, a grinder, a granulator, a chipper, and any other suitable device for reducing the size of individual pieces within the solid waste mixture. By shredding the solid waste mixture, the maximum dimensions and maximum diameters of individual pieces within the solid waste mixture are reduced, thereby enhancing the blending of the individual components of the solid waste mixture during subsequent steps of the method 100, resulting in a more uniform composition within the solid fuel blocks produced using the method 100.

The shredded solid waste mixture may include a plurality of pieces with a maximum dimension or a maximum diameter of less than about 4 inches. The plurality of pieces may have a maximum dimension or maximum diameter of less than 3.5 inches, less than 3 inches, less than 2.5 inches, less than 2 inches, less than 1.5 inches, and less than 1 inch, and less than 0.5 inches. The maximum dimension may be less than about 2 inches.

Initial Heating of Solid Waste Mixture

Next the method includes introducing the solid waste mixture into a process vessel at step 104. The solid waste mixture may be introduced into the process vessel using any known devices and methods without limitation. The solid waste mixture may be introduced by opening a resealing hatch or other opening of the process vessel, inserting the solid waste mixture, and closing and/or resealing the resealing hatch. The system may include a loading device including, but not limited to, a hopper to introduce the solid waste mixture into the process vessel as described herein. The loading device may be operatively coupled to a shredding device or may incorporate a shredding device. The loading device may include a mixer to blend the pieces within the solid waste mixture prior to introduction into the process vessel.

After entry in to the process vessel, the solid waste mixture is heated to a temperature of about 100° C. at step 106, such as from about 90° C. to about 110° C. At this temperature, water and volatile organic compounds within the solid waste mixture which have a boiling point at or below the boiling point of water are vaporized. The vaporized compounds include, but are not limited to, water, organic solvents, and other compounds that may be vaporized within the solid waste mixture, thereby separating the solid waste mixture into a dried solid waste and vaporized compounds. The vaporized compounds may primarily comprise or consist essentially of water.

Without wishing to be bound by theory, proceeding directly to high-temperature processing without lower-temperature drying causes the mixed plastics in the solid waste mixture to melt, thereby reducing the void space within the solid waste mixture and trapping water and VOCs within the solid waste mixture. In addition, some low-melt plastics and plasticizers at higher temperatures may react with the residual water, which would interfere with the chemistry in later process steps. Instead, the solid waste mixture is first dried at a lower temperatures (e.g., between about 90° C. and about 110° C.) to evaporate water and to warm the non-aqueous content. After the water evaporates and is removed from the process vessel, the temperature is increased, allowing the plastics to melt within the low-moisture dried solid waste mixture.

The solid waste mixture may optionally be mixed as it is heated at step 106. Without being limited to any particular theory, the mixing may blend the individual components of the solid waste mixture into a more consistent composition and may also reduce voids or air pockets within the solid waste mixture. In addition, the mixing may enhance the heat exchange from the heated walls of the process vessel and the solid waste mixture within the vessel; the compression and shearing imparted to the solid waste mixture by the mixing blades may further enhance heating. Further, the mixing may facilitate the release of steam and other vaporized compounds from the heated solid waste mixture.

The solid waste mixture may be mixed within the process vessel at a mixing speed selected to impart shear stress to the solid waste mixture sufficient to mechanically break down pieces or chunks of solid waste into successively smaller pieces or chunks. The mixing speed may also depend upon any one or more of at least several additional factors including, but not limited to, the type of mixer or mixing blade provided within the process vessel, and/or the mixing time.

The process vessel may be designed to provide a heated wall to transfer heat into the solid waste mixture as it is mixed within the vessel as described herein below. The heated wall may be maintained at a temperature essentially equal to a final temperature of the solid waste mixture. Such temperatures are suitable for converting the solid waste mixture into a solid fuel mixture. The at least one heated wall may be maintained at a temperature at least about 30° C. or higher than the desired final temperature of the solid waste mixture to accelerate the heating process.

The vaporized compounds released by the solid waste mixture during heating at step 106 may be retained within the headspace of the process vessel to be removed in a subsequent step described herein below. The vaporized compounds released by the solid waste mixture during heating at step 106 may be continually removed from the process vessel.

Removing Vaporized Compounds

Referring again to FIG. 1, the method may further include removing any vaporized compounds released by the heated solid waste mixture at step 108. The vaporized compounds may include steam (i.e. water vapor) and/or any one or more of the additional vaporized compounds described herein. The vaporized compounds may be removed by applying a vacuum within the interior volume of the process vessel after the heating and optional mixing of the solid waste mixture at step 106. The vacuum may be generated by a vacuum system attached to the process vessel at a vacuum port as described herein below. Sweep air may be introduced into the process vessel to facilitate the movement of the vaporized compounds out of the vessel.

The vacuum system may continuously remove any vaporized compounds throughout the duration of heating and optional mixing conducted at step 106. The vacuum pressure maintained within the process vessel may prevent the combustion of any materials within the solid waste mixture and associated energy loss as it is dried and heated. Without being limited to any particular theory, the vacuum pressure within the process vessel may also lower the vaporization temperatures of the water and other vaporized compounds described herein above, thereby decreasing the time needed to remove any vaporized compounds from the solid waste mixture. As described herein, sweep air may be introduced into the process vessel to facilitate the movement of the vaporized compounds out of the vessel.

The vacuum system may comprise a condenser. The condenser may comprise an upper port, a lower port below the upper port, a condensate basin below the lower port, and a drain in the condensate basin. When present, the condenser is operatively coupled to the vacuum port of the process vessel via the upper port of the condenser, and the condenser is operatively coupled to the vacuum pump via the lower port of the condenser. The vacuum pump and condenser rapidly remove the vaporized compounds during processing to produce a condensate in the condenser, thereby preparing the fuel composition for pyrolysis without pyrolyzing the material.

The pressure maintained within the process vessel may less than about 6.67 kPa (50 torr), 6.00 kPa (45 torr), 5.33 kPa (40 torr), 4.67 kPa (35 torr), 4.00 kPa (30 torr), 3.33 kPa (25 torr), 2.67 kPa (20 torr), 2.00 kPa (15 torr), 1.33 kPa (10 torr), or 0.67 kPa (5 torr). The pressure maintained within the process vessel may be less than about 4.67 kPa (35 torr). The pressure maintained within the process vessel may be less than about 3.33 kPa (25 torr).

The range of pressures maintained within the process vessel can and will vary. The pressure is between about 5 torr and about 100 torr, such as between about 5 torr and 10 torr, between about 10 torr and 15 torr, between about 15 torr and 20 torr, between about 20 torr and 25 torr, between about 25 torr and 30 torr, between about 30 torr and 35 torr, between about 35 torr and 40 torr, between about 40 torr and 45 torr, between about 45 torr and 50 torr, between about 50 torr and 55 torr, between about 55 torr and 60 torr, between about 60 torr and 65 torr, between about 65 torr and 70 torr, between about 70 torr and 75 torr, between about 75 torr and 80 torr, between about 80 torr and 85 torr, between about 85 torr and 90 torr, between about 90 torr and 95 torr, and between about 95 torr and 100 torr.

The pressure maintained within the process vessel may be between about 40 torr and about 60 torr. The vaporized compounds removed from the process vessel at step 108 may include steam (water vapor) as well as one or more of the additional vaporized compounds described herein. The vaporized compounds may be additionally treated to produce recycled wastewater, as illustrated in FIG. 3.

Figure 3:
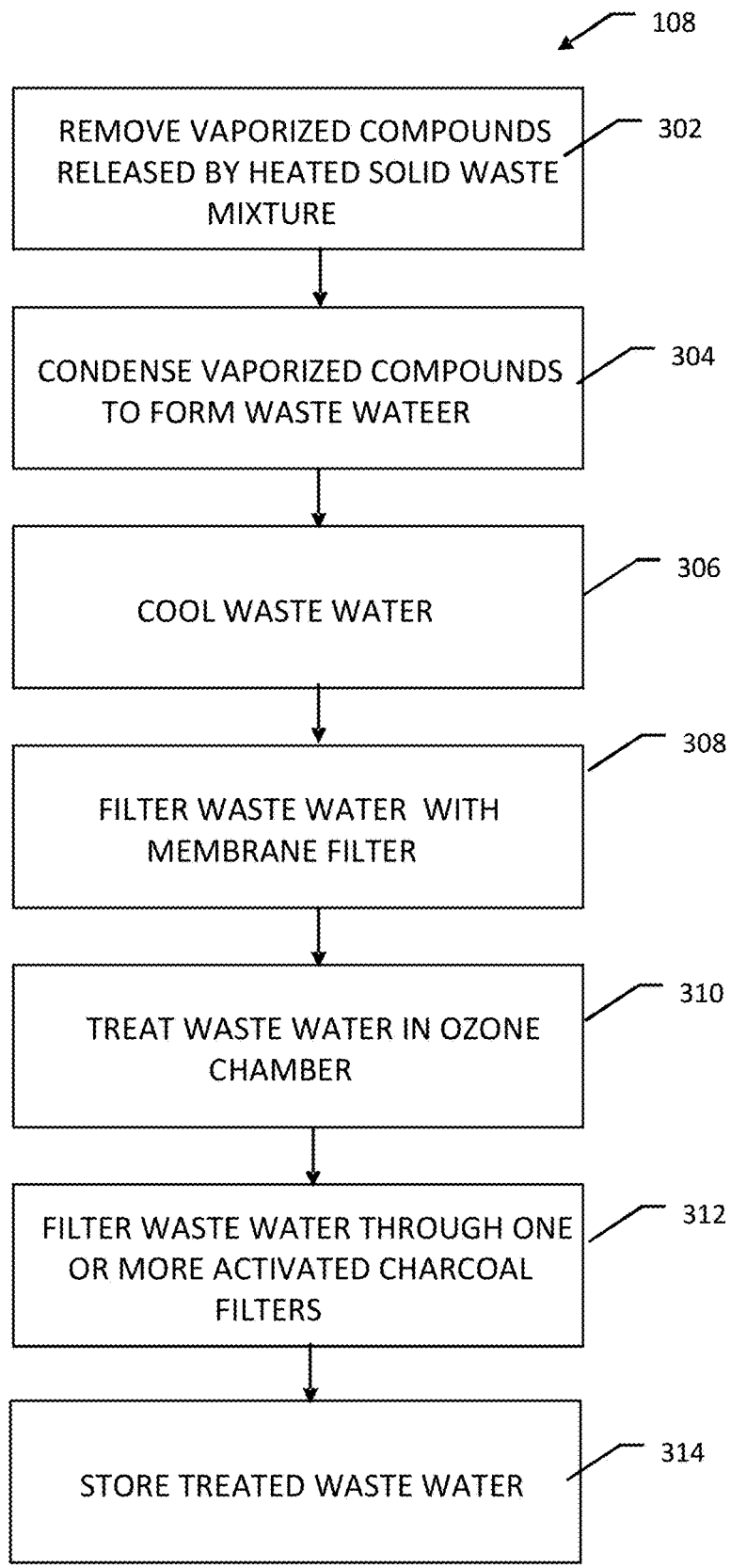
FIG. 3 is a flowchart illustrating a method of removing vaporized compounds from a heated solid waste mixture.

FIG. 3 is a flowchart illustrating a method 300 of additionally treating the mixture of vaporized compounds removed from the process chamber. The method 300 includes removing the vaporized compounds released by the heated solid waste mixture at step 302 and condensing the vaporized compounds to produce wastewater at step 304. The condensed wastewater may include one or more of the additional vaporized compounds including, but not limited to, chlorine and various organic solvents, in an aqueous solution. The vaporized compounds may have a temperature above about 100° C. This temperature may fall above the maximum operational temperature of various water treatment devices included in the vacuum system. By way of non-limiting example, a membrane filter may have a maximum operating temperature of about 85° C. and an activated carbon filter may have a maximum operating temperature of about 35° C.

Referring again to FIG. 3, the condensed wastewater may be cooled at step 306. The condensed wastewater may be stored in a wastewater tank exposed to atmospheric temperature conditions ranging from about −40° C. (−40° F.) to about +40° C. (100° F.) and allowed to cool. The wastewater tank may be constructed of a material with relatively high heat conductivity including, but not limited to, a metal material. The wastewater storage tank may be constructed from stainless steel. The wastewater tank may further include a water circulation device such as a stirrer or pump to circulate the wastewater within the tank to enhance the rate of cooling. The condensed wastewater may be cooled at step 306 to a temperature of less than about 85° C. prior to subjecting the condensed wastewater to additional water treatment devices as described herein below. The wastewater may be cooled at step 306 to a temperature of less than about 80° C., less than about 75° C., less than about 70° C., less than about 65° C., less than about 60° C., less than about 55° C., less than about 50° C., less than about 45° C., less than about 40° C., less than about 35° C., less than about 30° C., and less than about 25° C.

Referring again to FIG. 3, the method of treating the condensed wastewater may further include filtering the condensed wastewater through a membrane filter at step 308. Without being limited to any particular theory, the membrane filter may remove dissolved compounds including, but not limited to, one or more of the organic solvents described herein above. Any known membrane filter may be used at step 308 including, but not limited to, an asymmetrical polyether sulphone membrane filter, a Nylon™ (polyamide) membrane filter, and a Teflon™ (polytetrafluoroethylene, PTFE) membrane filter. The wastewater may be cooled to a temperature of less than about 85° C. prior to being subjected to membrane filtration at step 308. The wastewater may be cooled prior to step 308 to a temperature of less than about 80° C., less than about 75° C., less than about 70° C., less than about 65° C., less than about 60° C., less than about 55° C., less than about 50° C., less than about 45° C., less than about 40° C., less than about 35° C., less than about 30° C., and less than about 25° C.

Referring again to FIG. 3, the method of treating the condensed wastewater may further include subjecting the wastewater to an ozone treatment at step 310. Without being limited to any particular theory, the ozone treatment may destroy bacteria within the wastewater, rendering the wastewater sterile. Because the solubility of ozone in water is enhanced at cooler water temperatures, the water may be additionally cooled prior to step 310. The water may be filtered through the membrane filter at step 308 prior to the ozone treatment at step 310, thereby providing additional time for the wastewater to cool. The wastewater subjected to the ozone treatment at step 310 may be cooled to a temperature of less than about 40° C. The wastewater may be cooled prior to step 308 to a temperature of less than about 35° C., less than about 30° C., less than about 25° C., and less than about 20° C.

Referring again to FIG. 3, the wastewater may be filtered using an activated carbon filter at step 312. Without being limited to any particular theory, the activated carbon filter may remove chlorine gas, sediment, volatile organic compounds (VOCs), chlorinated organic compounds, taste, and odor from the wastewater. In addition, the adsorption process by which the activated carbon removes the contaminants from the wastewater may be enhanced at relatively low water temperatures. The water may be filtered through the membrane filter at step 308 and subjected to the ozone treatment at step 310 prior to the activated carbon filtration at step 312, thereby providing additional time for the wastewater to cool. The wastewater may be cooled to a temperature of less than about 40° C. prior to filtration through the activated carbon filter at step 312. The wastewater may be cooled prior to step 312 to a temperature of less than about 35° C., less than about 30° C., less than about 25° C., and less than about 20° C.

The wastewater treated at steps 308, 310, and 312 may be discharged as sewage or may be stored for subsequent use at step 314. Non-limiting examples of suitable subsequent uses for the treated wastewater include dust control and irrigation of nonfood crops such as energy crops.

Heat and Mix Dried Solid Waste Mixture

The dried solid waste mixture remaining in the process vessel after removing the vaporized compounds at step 108 may be further heated and mixed to a final temperature to at least about 160° C. at step 109. The final temperature must be sufficiently high to melt plastic material within the dried solid waste mixture. Without being limited to any particular theory, the admixing of the melted plastic with the other materials of the solid waste mixture may bind together and reduce the porosity of the resulting solid fuel composition. The melted plastics increase the density, increase the energy content, enhance of the waste resistance, and improve the downstream processing of the resulting solid fuel composition.

The final temperature of the dried solid mixture may depend on any one or more of at least several factors including, but not limited to, the composition of the solid waste mixture. If the solid waste mixture includes any chlorine-containing plastics, the final temperature may be elevated to a temperature sufficient to liberate the chlorine from the solid waste mixture, as described herein. The highest melting temperature of a plastic mixture included in the solid waste mixture may determine the final temperature, to ensure that all plastics in the solid waste mixture are melted.

Figure 2:
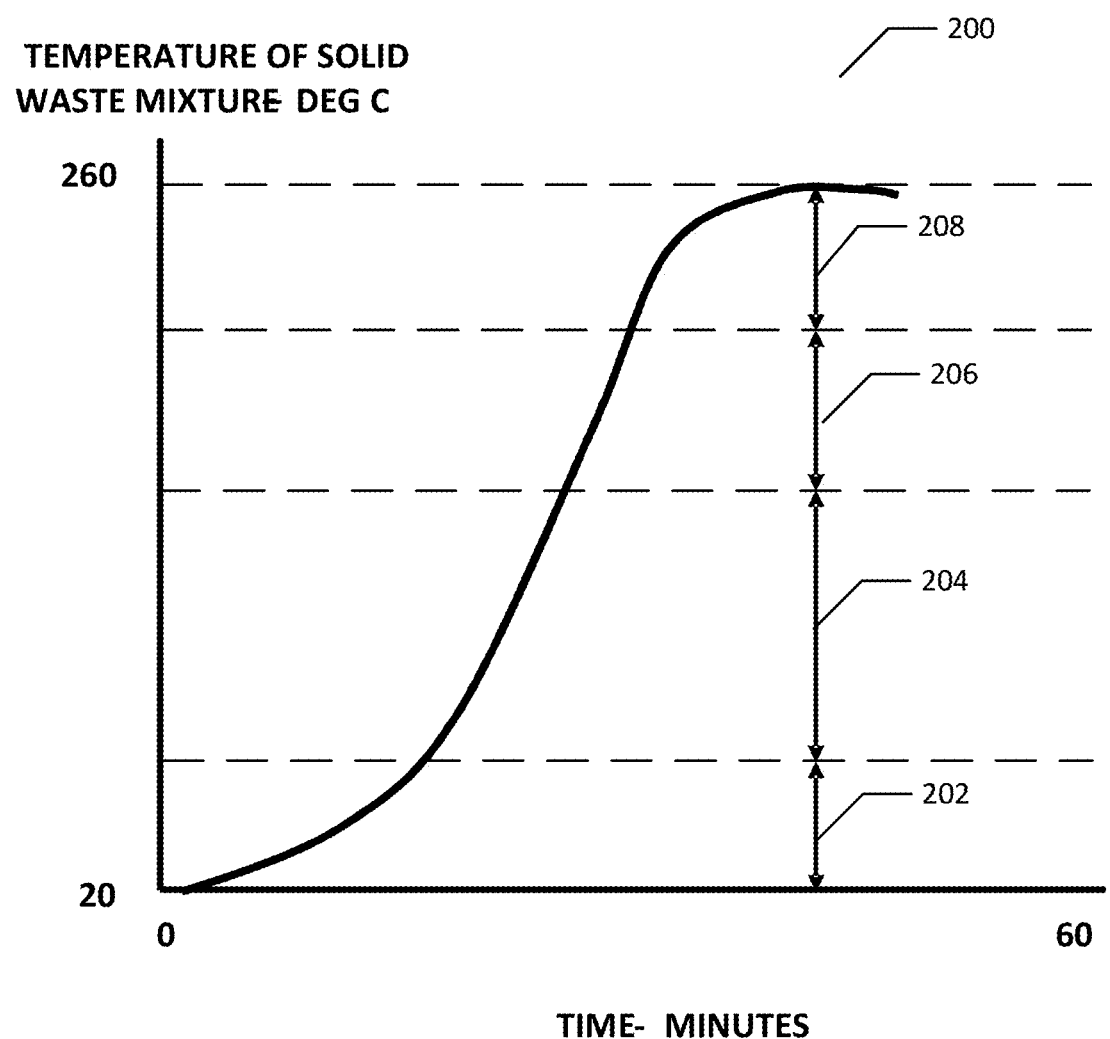
FIG. 2 is a graph schematically illustrating a temperature profile and associated processes within a solid waste mixture during a process of producing a solid fuel composition from the solid waste mixture.

FIG. 2 is a graph schematically illustrating the temperature profile of a solid waste mixture within the process vessel after introduction into the vessel at an initial time t=0. At a first temperature range 202, the solid waste mixture is heated from an initial temperature corresponding to the ambient temperature to a temperature of about 100° C. As the temperature of the solid waste increases up to and beyond about 100° C., the moisture and other volatile compounds within the solid waste mixture may be vaporized and released as a mixture of vaporized compounds, thereby separating the solid waste mixture into the vaporized compounds and a dried solid waste mixture. For example and by way of observation, at temperature above about 190° C. chlorinated organic compounds and chlorine gas are liberated from the solid waste mixture.

Mixing the solid waste mixture enhances the release of the steam by replenishing the outer surface from which the steam may be released, as well as compressing the solid waste mixture to squeeze out any voids or vapor bubbles formed within the solid waste mixture. In addition to the release of steam and other vaporized compounds, the solid waste mixture may also be sterilized within the second temperature range 204.

Referring again to FIG. 2, as the temperature increases beyond about 200° C., various organic compounds within the solid waste mixture may be broken down. Within the third temperature range from about 200° C. to about 240° C., various volatile compounds may be liberated from any plastics included within the solid waste mixture and released as additional vaporized compounds in addition to any steam that may continue to be released. Chlorine may be released from chlorine-containing plastics including, but not limited to, polyvinyl chloride (PVC) plastics. Various organic solvents may be released from the heated solid waste mixture.

Non-limiting examples of other additional vaporized compounds that may be released during the heating of the solid waste mixture include acetone, benzene, carbon disulfide, chloromethane, ethyl acetate, 2-hexanone, methyl ethyl ketone, styrene, butyl alcohol, THF, toluene, benzyl alcohol, bis(2-chloroethoxy)methane, diethyl phthalate, dimethylphthalate, diphenylhydrazine, bis(2-ethylhexyl) phthalate, isophorone, methyphenol, nitrobenzene, nitrophenol, nitroso di-n-propylamine, o-toluidine, hexanedioic acid, bis(2-ethylhexyl)ester, tetracosahexaene, and furanmethanol.

As the temperature increases above about 240° C. into the fourth temperature range 208, plastic material within the solid waste mixture must be melted and admixed with the other constituents of the solid waste mixture. The maximum temperature of the solid waste mixture may range between about 160° C. and about 300° C. The maximum temperature may be about 160° C., about 170° C., about 180° C., about 190° C., about 200° C., about 210° C., about 220° C., about 230° C., about 240° C., about 245° C., about 250° C., about 255° C., about 260° C., about 265° C., about 270° C., about 275° C., about 280° C., about 285° C., about 290° C., about 295° C., and about 300° C. The maximum temperature may be about 190° C. The maximum temperature may be about 260° C., as illustrated in FIG. 2. The maximum temperature and processing conditions should be controlled such that the solid waste mixture does not pyrolyze.

The one or more heated walls may be maintained at a temperature corresponding to the maximum temperature of the solid waste mixture. The one or more heated walls may be maintained at a temperature higher than the maximum temperature of the solid waste mixture. By maintaining the one or more heated walls at a higher temperature, the solid waste mixture may be heated up to the maximum temperature in a shorter time.

The one or more heated walls may be maintained at a temperature that may be about 30° C. higher than the maximum temperature of the solid waste mixture. The one or more heated walls may be maintained at a temperature that may be about 30° C. higher, about 40° C. higher, about 50° C. higher, about 60° C. higher, about 70° C. higher, about 80° C. higher, about 90° C. higher, about 100° C. higher, about 120° C. higher, about 140° C. higher, about 160° C. higher, about 180° C. higher, and about 200° C. higher than the maximum temperature of the solid waste mixture prior to extrusion. The maximum temperature and processing conditions should be controlled such that the solid waste mixture does not pyrolyze.

The solid waste mixture may be heated within the process vessel for a duration ranging from about 15 minutes to about 120 minutes to permit sufficient time for the solid waste mixture to homogenize and for the mixed plastics to melt. The duration of heating may depend on any one or more of at least several factors including, but not limited to, the solid waste mixture introduced into the process vessel, the temperature of the one or more heated walls, the specific heats of the various constituents of the solid waste mixture, and the mixing speed. The solid waste mixture may be heated for a duration ranging from about 15 minutes to about 25 minutes, from about 20 minutes to about 30 minutes, from about 25 minutes to about 35 minutes, from about 30 minutes to about 40 minutes, from about 35 minutes to about 45 minutes, from about 40 minutes to about 50 minutes, from about 45 minutes to about 55 minutes, from about 50 minutes to about 60 minutes, from about 55 minutes to about 65 minutes, from about 60 minutes to about 90 minutes, from about 75 minutes to about 105 minutes, and from about 90 minutes to about 120 minutes. The solid waste mixture may be heated within the process vessel for a duration of about 30 minutes. The solid waste mixture may be heated within the process vessel for a duration of about 60 minutes.

The duration of mixing and heating performed on the solid waste mixture at step 109 may be determined by any one or more of at least several methods. The process vessel may include a sighting glass through which an operator of the system may visually monitor the solid waste mixture as it is heated and mixed within the process vessel. The operator of the system may manually deactivate the mixer when the operator observes that the solid waste mixture has been converted to the solid fuel composition. By way of non-limiting example, the operator may manually deactivate the mixer when the plastics within the solid waste mixture are observed to be melted and admixed with the other constituents of the solid waste mixture.

The method may include monitoring the temperature of the solid waste mixture as it is heated and mixed at step 109. The temperature may be monitored using a temperature sensor included in the process vessel as described herein. The monitored temperature of the solid waste mixture may be displayed to an operator of the system and used to determine the duration of heating and mixing in step 109. By way of non-limiting example, the operator of the system may deactivate the mixer when the displayed temperature of the solid waste mixture within the process vessel exceeds a maximum temperature described herein above. The measured temperature of the solid waste mixture may be communicated to an automated control system. The automated control system may deactivate the mixer when the measured temperature of the solid waste mixture exceeds the maximum temperature described herein previously.

The process vessel may include a single interior volume within which the heating and mixing of steps 106 and 109 are conducted. The process vessel may include an interior wall dividing the interior volume into a drying chamber and a mixing chamber. The heating of the solid waste mixture at step 106 may occur within the drying chamber, followed by the removal of the vaporized compounds at step 108 within the same drying chamber. Also, the dried solid mixture remaining in the drying chamber after step 108 may transferred into the mixing chamber through a transfer opening contained within the interior wall. Optionally, the mixing chamber may also include a vacuum attachment fitting to enable the application of vacuum from the vacuum assembly to either periodically apply a vacuum to the mixing chamber or to maintain a vacuum within the mixing chamber to remove any additional vaporized compounds released during the heating of the dried solid waste mixture.

Extrusion of Heated Solid Waste Mixture

Referring again to FIG. 1, after heating and mixing the dried solid waste mixture at step 109 and optionally removing any residual steam and other vaporized compounds released during heating to the final temperature, the dried solid waste mixture may have formed into a heated solid waste mixture made up of a relatively uniform viscous material in which the melted plastics are distributed throughout the material. The heated solid waste mixture may be extruded from the process vessel at step 110.

The heated solid waste may be extruded from the process vessel using any extrusion method known in the art without limitation. The process vessel may be provided with an extruder outlet as described herein below. The extruder outlet may include a cross-sectional profile with a variety of shapes and dimensions. The cross-sectional profile of the extruder outlet may be selected to produce a solid fuel composition with a shape that facilitates handling, transportation, storage, and/or subsequent use. Non-limiting examples of suitable cross-sectional profile shapes include circular, triangular, square, or any other closed polygonal shape.

The maximum dimension of the cross-sectional profile of the extruder outlet may vary from about 1 inch to about 12 inches or larger. The maximum dimension may vary from about 1 inch to about 3 inches, from about 2 inches to about 4 inches, from about 3 inches to about 5 inches, from about 4 inches to about 6 inches, from about 5 inches to about 7 inches, from about 6 inches to about 8 inches, from about 7 inches to about 9 inches, from about 8 inches to about 10 inches, from about 9 inches to about 11 inches, and from about 10 inches to about 12 inches. The cross-sectional profile of the extruder outlet may be a square shape with a maximum dimension of 2 inches.

The process vessel may be provided with any known device to compress the heated solid waste mixture through the extruder outlet without limitation. The process vessel may be provided with a mixer that includes a screw conveyor that may be operated in one direction during the mixing phase and may be operated in a reverse direction to extrude the heated solid waste mixture. The process vessel may include a screw conveyer within a partially enclosed channel within a bottom portion of the vessel wall. The screw conveyer may be activated to initiate the extrusion of the heated solid waste mixture at step 110.

The heated solid waste mixture may cool as it extruded into the cooler temperatures outside of the process vessel. The extruder outlet may be heated to maintain the temperature of the heated solid waste mixture at an extrusion temperature. Without being limited to any particular theory, the extrusion temperature may be selected to maintain a viscosity within the heated solid waste mixture compatible with extrusion using the extrusion elements provided in the process vessel. The extruder outlet may be heated using any known heating method including, but not limited to, an electrical resistive heater, a heated jacket, an inductive heater, and any other known suitable heating methods.

The heated solid waste mixture may emerge from the extruder outlet at a temperature below the maximum temperature of the heated solid waste mixture within the process vessel. The temperature of the extruded solid waste mixture may range from about 100° C. to about 260° C. The temperature of the extruded solid waste mixture may range from about 100° C. to about 140° C., from about 120° C. to about 160° C., from about 140° C. to about 180° C., from about 160° C. to about 200° C., from about 180° C. to about 220° C., from about 200° C. to about 240° C., and from about 220° C. to about 260° C.

The temperature of the extruded solid waste mixture may be about 200° C. The extruded solid waste mixture may be below about 200° C. Although higher temperatures have been used, pyrolysis of the extruded solid waste mixture has been observed to occur at extrusion temperatures above 200° C.

The extruded solid waste mixture may optionally be cut into pieces as it is extruded. Any known devices for cutting extruded materials may be used to cut the extruded solid waste mixture including, but not limited to, laser cutters, saws, water jet cutters, and any other suitable cutting device. The extruded waste mixture may be cooled slightly to harden the material prior to cutting. The extruded solid waste mixture may be cut into pieces less than about two feet in length.

The extruded solid waste mixture may be cooled at ambient temperature conditions outside of the process vessel. The cooling rate of the extruded solid waste mixture may be accelerated using one or more cooling devices or methods. The extruded solid waste mixture may be cooled using one or more devices to enhance heat transfer away from the extruded waste mixture including, but not limited to, air fans, misting fans, water cooling tanks, chilled surfaces, refrigerated chambers, and any other known material cooling device. A conveyor, such as a water-cooled conveyor, may be used to allow the extruded solid waste to cool to form a solid fuel composition.

The extruded solid waste mixture may be rapidly cooled; that is, cooled faster than leaving the mixture under ambient conditions. Doing so may promote solidification and storage stability. The time taken to cool the extruded solid waste can and will vary. The time for the extruded solid waste mixture to cool may be about 15 minutes, about 14 minutes, about 13 minutes, about 12 minutes, about 11 minutes, about 10 minutes, about 9 minutes, about 8 minutes, about 7 minutes, about 6 minutes, about 5 minutes, about 4 minutes, about 3 minutes, about 2 minutes, about 1 minutes, about 30 seconds, or about 15 seconds. The extruded solid waste mixture may cool in less than 10 minutes. The extruded solid waste mixture may cool in less than 5 minutes. The extruded solid waste mixture may cool in less than 1 minute.

The solid waste mixture may be formed into pieces using a method other than extrusion. Any known method of forming a viscous material into a desired shape may be used to form the pieces including, but not limited to, compression molding. By way of non-limiting example, the heated solid waste mixture may be removed from the process vessel and divided into a plurality of molds and compressed into a desired shape. The desired shape may be similar to the shape of the pieces formed using an extrusion method as described herein above. The desired shape may be a rod with a maximum cross-section of about two inches and a rod length of about 2 feet. The cross-sectional profile of the desired shape may be a circle, a square, or any other suitable cross-sectional profile.

The extruded solid waste mixture may be cooled to form the solid fuel composition. The resulting solid fuel composition is sterile, hydrophobic, chemically stable, and/or non-biodegradable. "Sterile" refers to the solid fuel composition being substantially free of living microorganisms, such as bacteria, fungi, and viruses, after being produced. "Stable" or "chemically stable" refers to solid fuel composition not substantially changing its chemical or physical properties or structure upon extended contact with water, oxygen, or ambient conditions, especially under ordinary storage conditions. The solid fuel composition is "stable" until it is combusted, pyrolyzed, or employed as feedstock in a similar process. "Non-biodegradable" refers to the solid fuel composition not degrading or deposing under ordinary biological action, such as rot or composting. As a result, the solid fuel composition may be stored for extended periods at a wide range of storage conditions, used as feedstock to a collocated waste-to-energy facility, transported to a remote waste-to-energy facility, and/or used to provide energy for the process vessel and associated devices.

The solid fuel composition pieces may be optionally ground into smaller pieces suitable for use as a feedstock to a pyrolysis reactor. The particle size of the smaller pieces may vary depending on the particular pyrolysis reactor for which the solid fuel composition may be used as a feedstock. The particle size of the smaller pieces may range from about 0.1 mm to about 10 mm. The smaller pieces may have a maximum particle size of about 3 mm. The ground pieces of the solid fuel composition may be formed into a building material by extruding the solid fuel composition into a lumber profile using known equipment and methods.

II. System for Forming Solid Fuel Composition

Figure 7:
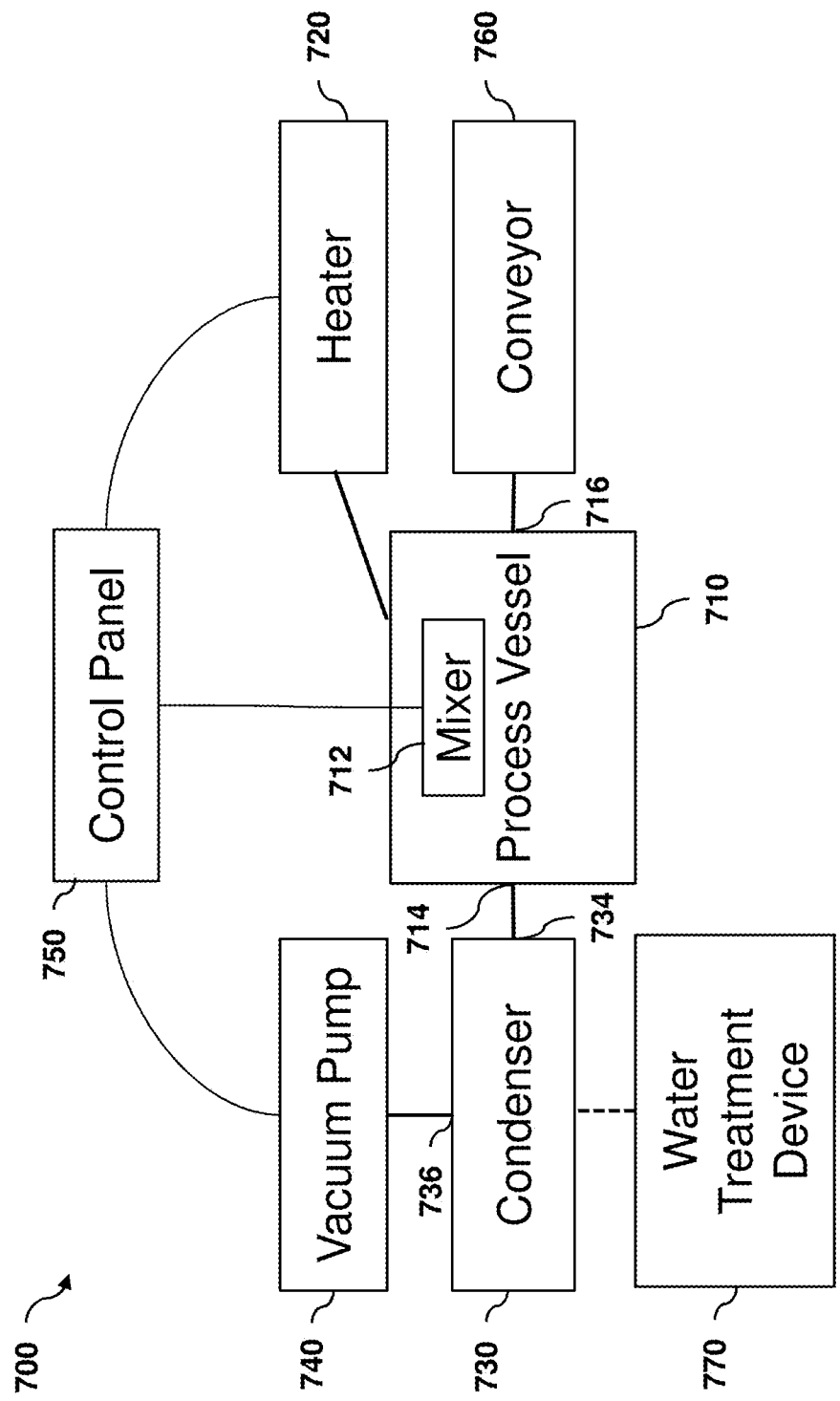
FIG. 7 is a schematic of a system as disclosed herein.

A system for producing a solid fuel composition from a solid waste mixture is provided. FIG. 7 is a generalized schematic of a system for processing mixed solid wastes, as disclosed herein. System 700 comprises a process vessel 710, a heater 720, a condenser 730, a vacuum pump 740, a control panel 750, a conveyor 760, and one or more optional water treatment devices 770. The process vessel 710 comprises a mixer 712 within the interior volume of the process vessel 710 and operatively connected to the process vessel 710. The process vessel 710 also has an extruding element 716 passing through a first opening in the process vessel 710, and a vacuum port 714 passing through a second opening in the process vessel 710. The heater 720 is operatively connected to the process vessel 710 to heat the interior volume of the process vessel 710, for example by heating one or more walls of the process vessel 710.

The condenser 730 comprises an upper port 734 and a lower port 736. The condenser is operatively coupled to the vacuum port 714 of the process vessel 710 via the upper port 734 of the condenser 730. The vacuum pump 740 is operatively coupled to the condenser 730 via the lower port 736 of the condenser 730. The control panel 750 is operatively connected to the mixer 712, the heater 720, the vacuum pump 740, and one or more optional sensors within the system 700. The conveyor 760, acting as a cooling unit, is operatively connected to the extruding port 716 of the process vessel 710 to receive extruded material. More detail can be found in the subparts described herein. Optional filters 770 may be operatively connected to condenser 730 to treat condensate formed in the condenser 730 during operation of the system 700.

Figure 4:
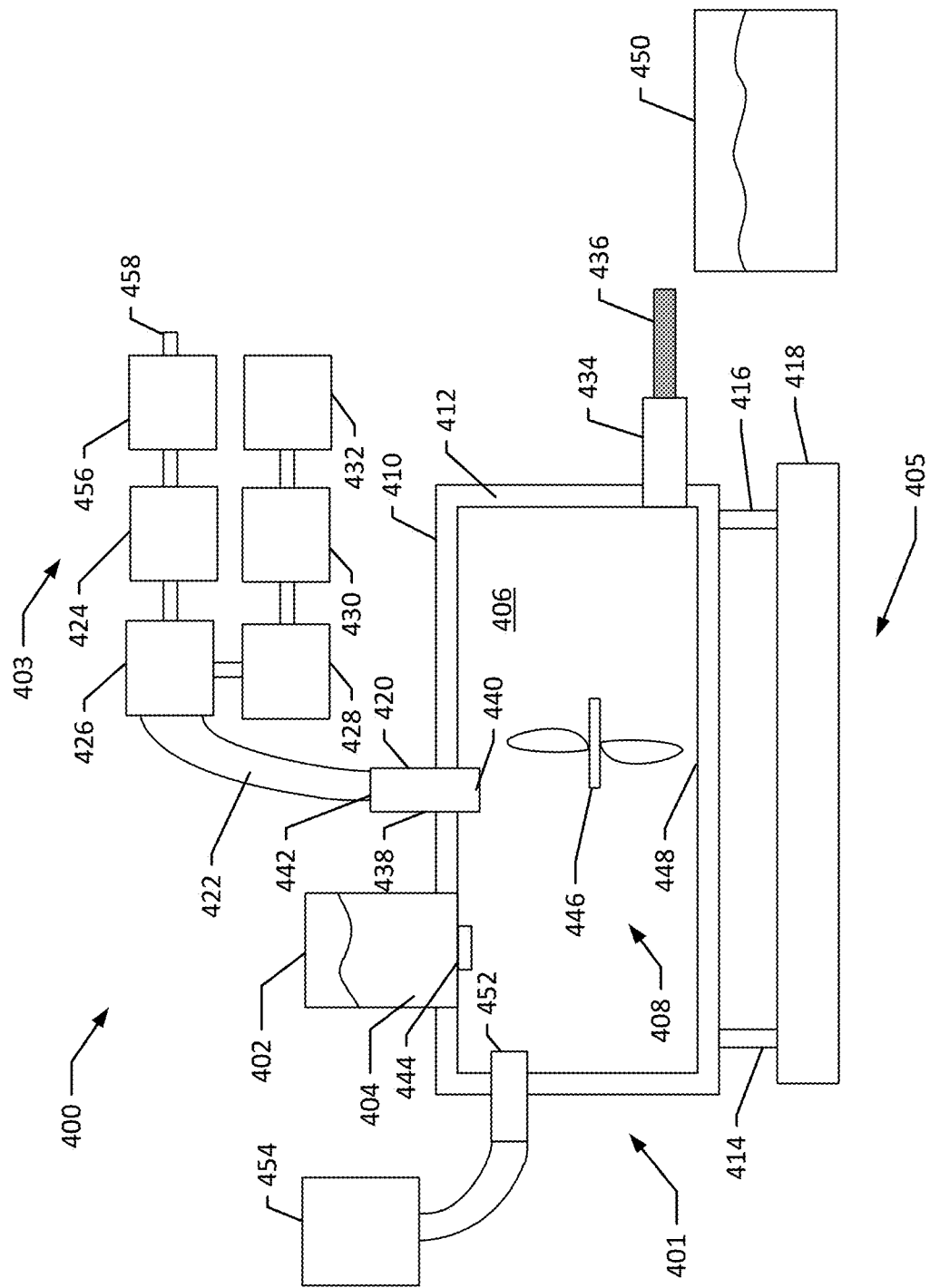
FIG. 4 is a block diagram of a system for producing a solid fuel composition from a solid waste mixture.

FIG. 4 is a block diagram illustrating the elements of the system 400. The system 400 may include a process vessel 401 operatively connected to a heater 405 and a vacuum system 403. The process vessel may include a mixer 408 to mix the solid waste mixture as it is heated by the heater 405. In addition, the vacuum system 403 maintains a relatively oxygen free atmosphere within the process vessel 401 and additionally removes water vapor and other vaporized compounds as they are released from the heated solid waste mixture within the process vessel 401. The system provides the devices and elements suitable for carrying out the process of forming a solid fuel composition as described herein.

Process Vessel

Referring to FIG. 4, the system 400 may include a process vessel 401. The process vessel 401 comprises one or more heated walls maintained at a wall temperature, a mixer 408 in the interior volume of the process vessel and operatively connected to the process vessel 401, an extruding element passing through a first opening in the process vessel 401, and a vacuum port passing through a second opening in the process vessel. The process vessel 401 encloses an internal volume 406 containing a mixer 408. The solid waste mixture may be introduced into the internal volume 406 and agitated using the mixer 408 and heated using the heater 405 operatively coupled to the vessel 401. The pressure within the internal volume 406 may be maintained at a vacuum pressure below about 50 torr using the vacuum system operatively coupled to the vessel 401 via the vacuum port. The process vessel 401 may be constructed of any known material with suitable strength, non-reactivity, and/or heat resistance up to at least a maximum temperature of about 300° C. The material of the vessel 401 may have a high heat conductivity to facilitate the heating of the internal volume by the heater 405. The material of the process vessel 401 may be compatible with particular heating methods, including, but not limited to, conduction heating and inductive heating. The process vessel 401 may be constructed of a metal including, but not limited to, stainless steel.

The process vessel 401 may vary in overall size depending on any one or more of at least several factors, including, but not limited to, the solid waste mixture to be mixed within the vessel 401, the type of mixer 408 included within the vessel 401, and/or the desired footprint of the vessel 401 at the waste-to-energy facility or other site at which the system 400 is to be operated.

The process vessel 401 may be provided as an essentially rectangular container. The length of the process vessel 401 may range from about 5 feet to about 20 feet. The height and width of the process vessel 401 may each range from about 5 feet to about 10 feet. The process vessel 401 may have a length of about 10 feet, a width of about 7 feet and a height of about 7 feet.

Referring again to FIG. 4, the process vessel 401 may further include one or more openings, ports, and/or hatches to provide access to/from the internal volume 406 of the vessel 401 and/or to provide operative coupling of one or more devices associated with the system including, but not limited to, the vacuum system. Non-limiting examples of the one or more openings include an exhaust port 420, an extrusion outlet 434, and an inlet 444. The one or more openings of the vessel are described in further detail herein below.

Resealing Opening/Optional Hopper

The solid waste mixture may be introduced into the internal volume 406 of the process vessel 401 to initiate the method of forming the solid fuel composition as described herein above. The solid waste mixture may be introduced into the internal volume 406 via a resealing opening including a hatch, a door, a port, or any other suitable resealing opening formed in a vessel wall. The resealing opening may be opened to insert the solid waste mixture into the vessel 401, and subsequently closed prior to initiating the heating and mixing within the process vessel 401. The resealing opening may be provided with seals, gaskets, and/or any other features to form an airtight seal when the resealing opening is closed.

Referring again to FIG. 4, the system 400 may optionally include a hopper 402 operatively coupled to the process vessel 401 to collect and introduce the solid waste mixture 404 into the internal volume 406 of the vessel 401. The hopper 402 may be coupled to the internal volume 406 via a solid waste inlet 444 provided within a vessel wall. The solid waste inlet 444 may be a resealing door configured to open and empty the solid waste mixture 404 from the hopper 402 into the internal volume 406. The resealing door may close and form a seal once the solid waste mixture is transferred from the hopper 402 into the internal volume 406. These configurations are suitable for batch processing, continuous processing, or semicontinuous processing.

Any known hopper design known in the art may be selected as the hopper 402 included in the system 400. The hopper 402 may further include a shredder (not shown) to shred the solid waste mixture into pieces suitable for mixing and heating within the process vessel 401 as described herein. In particular, the solid waste may be heated and mixed within the process vessel 401 under reduced pressure. A shredder may be operatively coupled to the vessel 401 via the solid waste inlet 444. The exit port of the shredder may feed the solid waste mixture into the internal volume 406. Any known shredder design may be suitable for inclusion in the system 400 including, but not limited to, a single shaft rotary shredder, a dual-shaft rotary shredder, a granulator, and a hammer mill shredder.

Mixer

Referring again to FIG. 4, the process vessel 401 may further include a mixer 408 to mix the solid waste mixture within the internal volume 406. Any known mixer design may be included in the process vessel without limitation. The mixer 408 may be selected based on any one or more of at least several factors including, but not limited to, ability to agitate the relatively dense and viscous solid waste mixture; ability to impart shear forces to the solid waste mixture; and energy requirements to drive the mixer. The mixer 408 may include at least one mixer blade 446.

The one or more mixer blades 446 may be oriented within the internal volume 406 such the axis of rotation of the one or more mixer blades 446 is aligned along the length of the vessel 401. Any suitable mixer blade design may be selected for inclusion in the system including, but not limited to, a screw conveyer and a naben blade.

The process vessel 401A may include dual mixer blades 502/504. The dual mixer blades 502/504 may counter-rotate to enhance the mixing of the solid waste mixture within the internal volume 406. By way of non-limiting example, the first mixer blade 502 may rotate in a clockwise direction and the second mixer blade 504 may rotate in a counterclockwise direction. In the example, the counter-rotating mixer blades 502/504 may carry solid waste mixture from the lower portion of the internal volume 406 to the upper portion, and would additionally force solid waste mixture from the upper portion of the internal volume downward between the mixer blades 502/504. The dual mixer blades 502/504 may be laterally spaced in close proximity to enable the grinding of the solid waste mixture between the mixer blades 502/504. The lateral spacing of the mixer blades 502/504 may provide a slight gap through which hard particles such as metal or ceramic bits may pass without jamming between the mixer blades 502/504.

Dual Chamber Process Vessel

Figure 6:
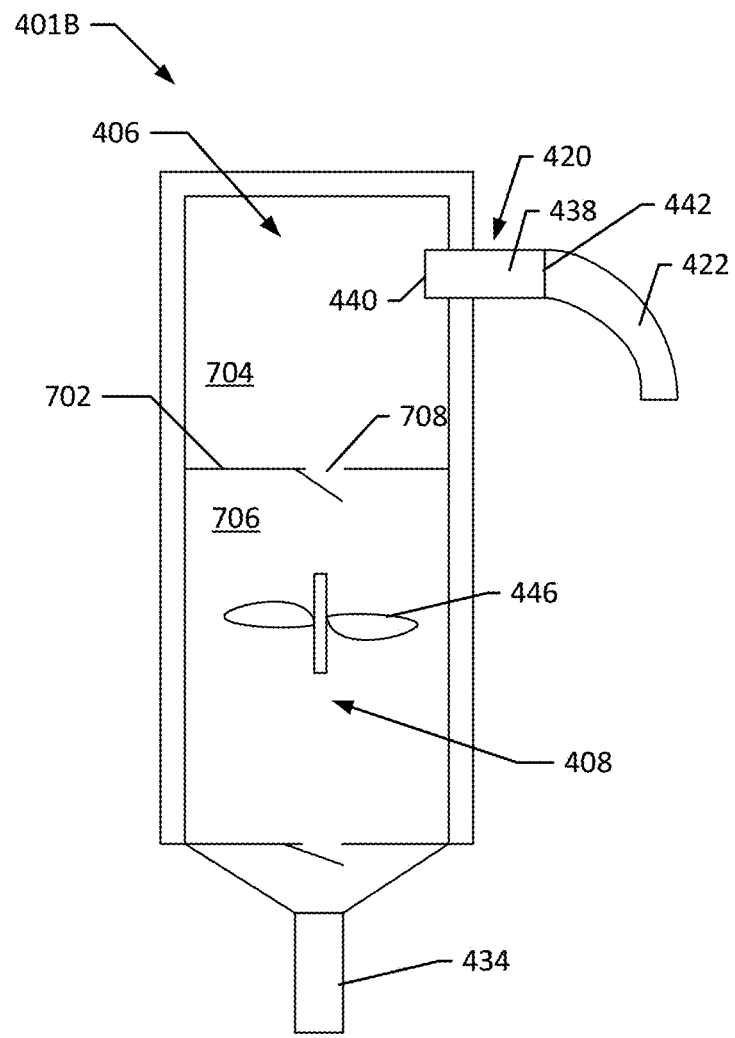
FIG. 6 is a schematic diagram of a dual-chamber process vessel.

The interior volume 406 of the process vessel 401 may be subdivided into separate drying and mixing chambers. FIG. 6 is a cross-sectional view of a process vessel 401B that includes an interior wall 702 that subdivides the interior volume into a drying chamber 704 and a mixing chamber 706. Both chambers 704/706 may be surrounded by a heated jacket to heat the contents of both the drying chamber 704 and the mixing chamber 706. The interior wall 702 may further contain a resealing door 708 that may open to transfer the contents of the drying chamber 704 into the mixing chamber 706.

The dual-chamber process vessel 401B may further include a mixer 408 situated within the mixing chamber 706. A second mixer 408A (not shown) may be situated within the drying chamber 704. The dual-chamber process vessel 401B may further include an extruder outlet 434 to provide a conduit through which the heated solid waste mixture may be extruded from the mixing chamber 706 and out of the vessel 401B.

Vacuum System

Referring again to FIG. 4, the process vessel 401 may be operatively coupled to the vacuum system 403. The process vessel 401 may include an exhaust port 420 to provide an operative coupling to the vacuum system 403. The exhaust port 420 may form a channel 438 opening to the internal volume 406 at an internal end 440 and to the exterior of the vessel 401 at the external end 442. The vacuum system 403 may be attached to the external end 442 of the exhaust port 420. The vacuum system 403 may be connected to the exhaust vent 420 via a vacuum hose 422.

The vacuum hose 422 may be reinforced to prevent collapse during use. The vacuum hose 422 may also be heat-resistant to ensure safe operation at temperatures up to the maximum temperature to which the solid waste mixture may be heated. The vacuum hose may be heat-resistant up to a temperature of about 300° C. The vacuum hose 422 may be chemically inert and/or corrosion resistant to resist degradation from any vaporized compounds removed from the internal volume 406 during heating of the solid waste mixture. The vacuum hose 422 may be a heavy steel-lined high heat hose.

Referring again to FIG. 4, the vacuum system 403 may include a vacuum pump 424. The vacuum pump 424 may be selected to maintain a sufficiently low pressure as described herein within the internal volume 406. In addition, the vacuum pump 424 may be chemically inert, heat resistant, and/or corrosion resistant. Further, the vacuum pump 424 may be sufficiently rugged to operate in the presence of any particles or other solid contaminants transferred from the internal volume 406. The vacuum pump 424 may be placed on a stand or a raised platform to prevent it from exposure to water during incidental flooding.

Any vacuum pump design may be included in the vacuum system 403 without limitation. Non-limiting examples of suitable vacuum pumps include a rotary vane pump, a diaphragm pump, and a liquid ring pump. The vacuum pump 424 may be a liquid ring pump. The vacuum pump 424 may be two or more liquid ring pumps connected in series. As described herein above, the vacuum pump 424 may maintain a pressure of less than about 50 torr within the internal volume 406 and may further remove any water vapor and/or other vaporized compounds released by the heated solid waste mixture into the internal volume 406.

Referring again to FIG. 4, an air source 454 may be operatively coupled to the process vessel 401 via an air inlet 452. The air source may introduce sweep air into the interior volume 406 of the process vessel 401 to facilitate the movement of the vaporized compounds out of the interior volume 406 and into the vacuum system 403. The air inlet may provide air at a flow rate selected to maintain a vacuum pressure of less than about 50 torr within the interior volume 406 when the vacuum system 403 is activated. The air source may be any known air source including, but not limited to, a compressed air tank; an air compressor, air pump, or fan drawing in atmospheric air, and any other known air source. The air source may supply an oxygen-free and non-reactive gas including, but not limited to, nitrogen and any noble gas such as argon.

The sweep air supplied by the air source 454 may be heated prior to introduction into the interior volume 406. The temperature of the sweep air may range from about 20° C. to about 280° C. The temperature of the sweep air may be at least 20° C., at least 40° C., at least 60° C., at least 80° C., at least 100° C., at least 120° C., at least 140° C., and at least 160° C. The sweep air may be heated using a dedicated sweep air heater operatively coupled to the air source 454. The sweep air may be directed through a heat-exchanging device to transfer waste heat from the heater 405 to the sweep air. The high temperature exhaust of the heater 405 may be directed into the air source 454 for use as sweep air.

Referring again to FIG. 4, the vacuum system 403 may further include a condenser 426 operatively connected to the vacuum pump 424 and to the process vessel 401 via the vacuum hose 422. The condenser 426 cools the water vapor and/or other vaporized compounds drawn from the process vessel 401 by the vacuum pump 424 to produce wastewater. The wastewater may be transferred to a cooling tank 428 that is also operatively connected to the condenser 426.

The cooling tank 428 may be any tank capable of holding a heated liquid that may include one or more of the vaporized compounds as described herein above. The cooling tank 428 may be constructed of a corrosion resistant and non-reactive material with a relatively high heat conductance to enhance the cooling of the wastewater. A chiller or other active cooling device (not shown) may be operatively coupled to the cooling tank 428 to enhance the cooling rate of the wastewater within the cooling tank 428.

The vacuum system may comprise a condenser. The condenser may comprise an upper port, a lower port below the upper port, a condensate basin below the lower port, and a drain in the condensate basin. When present, the condenser is operatively coupled to the vacuum port of the process vessel via the upper port of the condenser, and the condenser is operatively coupled to the vacuum pump via the lower port of the condenser.

As described herein above, the wastewater produced by the condenser 426 may include one or more of the additional vaporized compounds including, but not limited to, chlorine and various organic solvents, in an aqueous solution. Referring again to FIG. 4, the vacuum system 403 may further include one or more water treatment devices 430 operatively coupled in series to the wastewater-cooling tank 428 opposite to the condenser 426. The one or more water treatment devices 430 may be configured to remove the additional vaporized compounds from the condensed water to produce treated wastewater. Non-limiting examples of suitable water treatment devices 430 include membrane filters, ozone chambers, and activated carbon filters.

The one or more water treatment devices 430 may include a membrane filter. Any suitable membrane filter may be included as a water treatment device 430 within the vacuum system 403. Non-limiting examples of suitable membrane filters include an asymmetrical polyether sulphone membrane filter; a Nylon™ (polyamide) membrane filter; and a Teflon™ (polytetrafluoroethylene, PTFE) membrane filter. The membrane filter may be selected depending on the expected vaporized compounds to be removed from the wastewater. In addition, the membrane filter may be selected depending on the expected temperature of the wastewater leaving the cooling tank 428. For example, the Teflon™ (polytetrafluoroethylene, PTFE) membrane filter, with a maximum operating temperature of about 180° C. may tolerate much higher wastewater temperatures than a Nylon™ (polyamide) membrane filter, with a maximum operating temperature of about 80° C.

The one or more water treatment devices 430 may include an ozone chamber. The ozone chamber may sterilize the wastewater. An ozone chamber of any known design may be selected as a water treatment device 430. As described herein above, the maximum operating temperature of the ozone chamber may be about 40° C. Without being limited to any particular theory, the effectiveness of the ozone chamber may be enhanced at lower water temperature due to the increased solubility of ozone at lower water temperatures.

The one or more water treatment devices 430 may include an activated carbon filter. The activated carbon filter may adsorb any one or more of the additional vaporized compounds from the wastewater. As described herein above, the effectiveness of the adsorption of the vaporized compounds to the activated carbon is enhanced at lower water temperatures. The maximum operating temperature of the activated carbon filter is about 35° C.

The one or more water treatment devices 430 may be operatively coupled in a linear series so that each device may contact all wastewater to be treated. The sequence of water treatment devices 430 may be arranged to situate the most robust water treatment devices near the beginning of the linear series and to situate the more sensitive water treatment devices toward the end of the linear series. A robust water treatment device may be characterized by one or more of the following: relatively high operating temperature; relative insensitivity to a wide range of salinity and/or pH; and/or tolerance of fouling with particulate matter. The linear series of the one or more water treatment devices 430 may be arranged according to maximum operational temperature. A membrane filter with a relatively high maximum operational temperature may be first in the linear sequence, followed by an ozone chamber, followed by an activated carbon filter. The cooling tank 428 may cool the wastewater to a temperature below than of the lowest maximum operating temperature among the one or more water treatment devices 430, and the one or more water treatment devices 430 may be arranged in any desired order.

Referring again to FIG. 4, the vacuum system 403 may further include a treated wastewater holding tank 432 configured to store the wastewater treated by the one or more water treatment devices 430 for subsequent use and/or disposal. Any suitable water tank design may be selected for the wastewater-holding tank 432 without limitation. The wastewater-holding tank 432 may be constructed out of a wider variety of materials compared to the cooling tank 428 because the treated wastewater has been cooled and purified as described herein previously. The wastewater-holding tank 432 may be a reinforced fiberglass water tank. As described herein above, the wastewater may be used for dust control, irrigation of non-food crops, and/or disposed of as wastewater in a sewer system.

Referring again to FIG. 4, the air remaining in the condenser 426 after the vaporized compounds have been condensed may pass through the vacuum pump 424 and may be exhausted into one or more gas scrubbing devices 456. The gases exiting the vacuum pump may include air, as well as one or more additional gases including, but not limited to, methane, chlorine gas, chlorinated organic compounds, and volatile organic compounds. The one or more gas scrubbing devices 456 may include an adsorbent bed to separate methane and other combustible gases from the vacuum pump exhaust. The methane and other combustible gases captured by the adsorbent bed may be used to fuel the heater 405, stored for later use, and/or sold. The one or more gas scrubbing devices 456 may include a gas filter including, but not limited to, an activated carbon filter, a membrane filter, and any other known gas filtration device. The gas remaining after treatment by all of the one or more gas scrubbing devices 456 may be exhausted to the atmosphere via an exhaust port 458.

Heater

Referring again to FIG. 4, the system 400 may include a heater 405 operatively coupled to the process vessel 401. Any suitable heater design may be selected as the heater 405 including, but not limited to, an electrical heater, an inductive heater, and a convective heater such as a heated oil jacket. The heater 405 may transfer heat into the internal volume 408 via one or more heated walls 448 forming the boundary of the internal volume 408. The solid waste mixture may be heated within the internal volume 406 via conduction from the heater 405 to the heated wall 448 and via conduction from the heated wall 448 to a portion of the solid waste mixture contacting the heated wall 448.

The heater 405 may be a heated jacket surrounding the process vessel 401. The heated jacket may include a hollow shell 410 containing heated oil 412 circulating within the hollow shell between a heated oil inlet 414 and a heated oil exit 416. The temperature of the heated oil 412 may be increased by passing the oil 412 through a heat exchanger 418 configured to transfer heat into the oil 412 as it passes between the heated oil exit 416 and the heated oil inlet 414. The heat exchanger may be heated by any known heating device including, but not limited to, an electrical heater, a gas heater, an inductive heater, and any other suitable heating device. The operation of the heat exchanger 418 may be modulated using measurements of the heated oil obtained by at least one temperature sensor situated at one or more locations within the heater including, but not limited to the heated oil inlet 414 and the heated oil exit 416.

The temperature of the heated oil exiting the heat exchanger 418 may be cooled as it circulates back into the heated oil inlet 414. Further, the oil may further cool at it circulates within the hollow shell between the heated oil inlet 414 and the heated oil exit 416. The heat exchanger 418 may heat the oil to a temperature of up to about 500° C. or higher at the exit of the heat exchanger 418, depending on the extent of cooling during transport to the heated oil inlet 414. The oil exiting the heat exchanger 418 may be heated to at least 300° C., at least 420° C., at least 440° C., at least 460° C., and at least 480° C.

The heated oil may be introduced into the oil inlet at a temperature ranging from about 160° C. to about 330° C. The heated oil may be introduced into the oil inlet at a temperature of above about 300° C., such as above 350° C.

The heating oil may degrade over extended use due to accelerated oxidation at the relatively high temperatures to which the oil is heated. Any known means of maintaining the functional integrity of the heating oil may be used without limitation. A portion of the oil may be continuously discarded and replaced within the heated oil circuit using any methods and devices known in the art. The heater may be periodically deactivated and the oil may be changed during this inactive period.

The heater 405 may be operated to maintain a relatively constant heated wall temperature corresponding to a desired maximum temperature of the solid waste mixture within the process vessel 401, as described herein. The heated wall temperature may be maintained at a wall temperature of up to about 260° C. The heated wall temperature may be maintained at a wall temperature ranging from about 160° C. to about 300° C. The heated wall temperature may be maintained at a wall temperature of at least 160° C., at least 170° C., at least 180° C., at least 190° C., at least 200° C., at least 210° C., at least 220° C., at least 230° C., at least 240° C., at least 250° C., at least 260° C., at least 270° C., at least 280° C., and at least 290° C.

The heated wall temperature may influence the rate at which the solid waste mixture may be heated up to the final temperature as described herein above. The heated wall temperature may be maintained at the desired maximum temperature of the solid waste mixture. The heated wall temperature may be maintained at least 10° C. above the desired maximum temperature, at least 20° C. above the desired maximum temperature, at least 30° C. above the desired maximum temperature, at least 40° C. above the desired maximum temperature, at least 50° C. above the desired maximum temperature, at least 60° C. above the desired maximum temperature, at least 70° C. above the desired maximum temperature, at least 80° C. above the desired maximum temperature, at least 90° C. above the desired maximum temperature, and at least 100° C. above the desired maximum temperature of the solid waste mixture.

Extruder

The system 400 may further include an extruder to extrude the heated solid waste mixture out of the process vessel 401 via the extruder outlet 434. Referring to FIG. 4, the process vessel 401 may further include the extruder outlet 434 to provide a conduit through which the heated solid waste mixture may be extruded from the internal volume 406 out of the vessel 401. The extruder may include a compression element to compress the heated solid waste mixture toward the extruder outlet, thereby forcing the solid waste mixture through the extruder outlet 434.

The compression element may be any suitable compression element known in the art including, but not limited to a mixer blade, a screw conveyer, a piston, a compression pump, and any other suitable compression element. The compression element may be the mixer blade 446 as illustrated in FIG. 4 and FIG. 6. The mixer 408 may be operated in a forward rotational direction during the heating and mixing of the solid waste mixture, and then operated in a reverse rotational direction to compress the heated solid waste mixture toward the extrusion outlet 434 causing the extruded solid waste mixture 436 to emerge from the extrusion outlet 434.

The compression element may include a dedicated compression element 510 separate from the mixer blades 502/504. The compression element 510 may include a screw conveyer situated within a channel 506 formed within a lower portion 508 of the vessel wall 512. The extruder outlet 434 may be situated at one end of the channel 506. In use, the compression element 510 may be activated when the solid waste mixture has been heated to the maximum temperature ranging from about 160° C. to about 250° C. The compression element 510 compresses the heated solid waste mixture within the channel 506 toward the one end of the channel adjacent to the extruder outlet 434. In addition, the mixer blades 502/504 are continuously operated during extrusion, thereby forcing additional heated solid waste mixture downward between the mixing blades 502/504 toward the channel 506.

Figure 5:
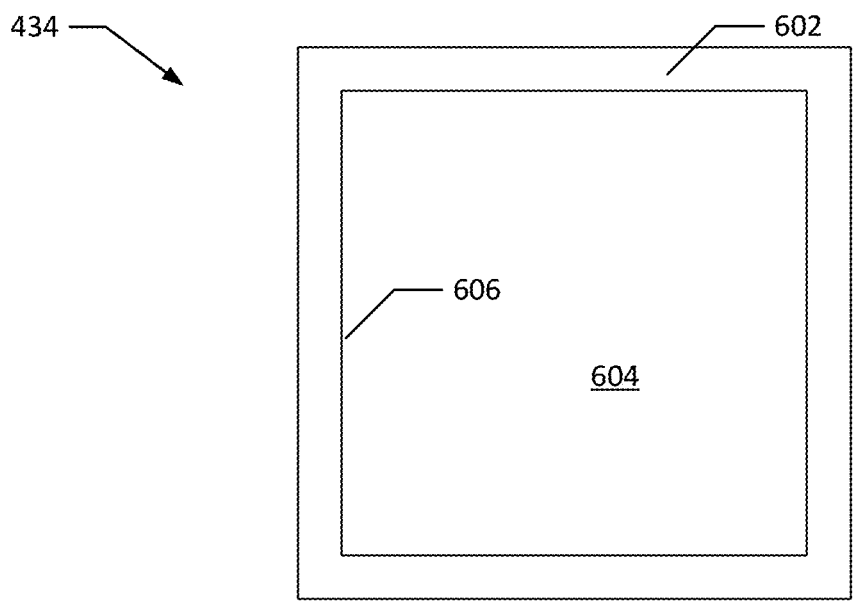
FIG. 5 is a cross-sectional view of an extruder outlet 434.

FIG. 5 is a cross-sectional view of an extruder outlet 434. The extruder outlet 434 may include an outlet wall 602 enclosing a lumen opening to the internal volume 406 at one end and to the outside of the process vessel 401 at the opposite end. The inner surface 606 of the outlet wall 602 may act as an extrusion die to form the cross-sectional shape of the extruded solid waste mixture. The inner surface 606 may define any suitable extrusion cross-sectional profile as described herein above including, but not limited to, a circular or square profile. By way of non-limiting example, the extrusion cross-sectional profile may be a square shape as illustrated in FIG. 5.

The extruder outlet 434 may be heated to facilitate the extrusion of the solid waste mixture. The extruder outlet 434 may be operatively connected to an extrusion heater (not shown) including, but not limited to, an electrical heater, an inductive heater, and a convective heater such as a heated oil jacket. The extrusion heater may transfer heat into the lumen 604 via the outlet wall 602. The extruding solid waste mixture may be heated within the lumen 604 via conduction from the heater to the outlet wall 602 and via conduction from the outlet wall 602 to a portion of the solid waste mixture contacting the outlet wall 602. The heater may be an additional portion of a heated jacket used to heat the remainder of the process vessel 401. Operating temperatures for the extruder are as described herein and generally should not exceed about 200° C.

The system 400 may optionally include a cutter (not shown) configured to cut the extruded solid waste mixture into pieces as it is extruded. Any known devices for cutting extruded materials may be selected for use as the cutter including, but not limited to, laser cutters, saws, water jet cutters, and any other suitable cutting device. The extruded waste mixture may be cooled slightly to harden the material prior to cutting. The extruded solid waste mixture may be cut into pieces less than about two feet in length.

The extruded solid waste mixture may be cooled using one or more devices to enhance air circulation including, but not limited to, air fans, misting fans, and any other known suitable air circulation device. The cooling rate of the extruded solid waste mixture may be enhanced by placing the extruded solid waste mixture on a cooled surface or within a cooled chamber including, but not limited to an air-conditioned room or refrigerated chamber. The extruded solid waste mixture may be immersed in a cooling liquid such as water in a cooling tank 450 as illustrated in FIG. 4. The extruded solid waste mixture may be extruded onto a conveyer, such as a water-cooled conveyer, to cool the extruded solid waste mixture and form a solid fuel composition.

Control Panel

The system may comprise a control panel operatively connected to the mixer, the heater, and the vacuum pump. The control panel, when present, adjusts the interior volume to a first temperature to vaporize compounds in a solid waste mixture comprising mixed plastics, adjusts the interior volume to a first pressure to remove the vaporized compounds from the solid waste mixture, to adjusts the interior volume to a second temperature between about 160° C. and about 260° C. and to a second pressure of less than about 50 torr while the mixer is in operation in order to melt the mixed plastics in the solid waste mixture.

The control panel may further comprise a feedback control system operatively connected to one or more sensors. When present, the feedback control system receives at least one measurement from the one or more sensors and modulates the operation of the vacuum pump, the heater, or the mixer according to at least one control rule executed in the control panel. The one or more sensors monitor one or more operating conditions of the system. Suitable examples of the one or more sensors include, but are not limited to, a pressure sensor to monitor the pressure within the interior volume of the process vessel; one or more temperature sensors, each temperature sensor to monitor the temperature of the oil introduced into the oil inlet of the heated jacket, and the temperature of the solid waste mixture within the interior volume; a humidity sensor to monitor the humidity of the vaporized compounds released from the interior volume; a weight sensor to monitor the weight of the solid waste mixture within the interior volume, and any combination thereof.

III. Solid Fuel Composition

A solid fuel composition produced from a solid waste mixture using the methods and systems as described herein above is provided. The solid fuel composition may be compatible for use as a feedstock to various pyrolysis chambers as part of a waste-to-energy process. The method of forming the solid fuel composition results in a material with relatively uniform consistency and reduced variability in energy content relative to the solid waste stream used to produce the solid fuel composition.

The solid fuel composition may have an energy content of at least 10,000 BTU/lb. The solid fuel composition may have an energy content of at least 10,000 BTU/lb., at least 11,000 BTU/lb., at least 12,000 BTU/lb., at least 13,000 BTU/lb., at least 14,000 BTU/lb., and at least 15,000 BTU/lb.

The solid fuel composition may have an energy content of at least about 8,000 BTU/lb. The solid fuel composition may have an energy content of at least about 9,000 BTU/lb. The solid fuel composition may have an energy content of less than about 14,000 BTU/lb. The solid fuel composition may have an energy content ranging from between about 8,000 BTU/lb. to about 14,000 BTU/lb.

The solid fuel composition may have a density ranging from about 30 lb./ft$^3$ to about 80 lb./ft$^3$. The density of the solid fuel composition may be at least 30 lb./ft$^3$, at least 40 lb./ft$^3$, at least 50 lb./ft$^3$, at least 60 lb./ft$^3$, and at least 70 lb./ft$^3$. The solid fuel composition may have a density of about 50 lb./ft$^3$.

As described herein, the solid fuel composition may also be chemically stable, non-biodegradable, and/or hydrophobic, thereby enabling the solid fuel composition to be stored at a wide range of storage conditions without degrading or reducing energy content. Without being limited to any particular theory, the plastic content of the solid waste mixture is melted and distributed throughout the resulting solid fuel composition, rendering the composition non-biodegradable, and/or hydrophobic.

The solid fuel composition may include from about 40% wt. to about 80% wt. carbon. The solid fuel composition may include from about 40% wt. to about 44% wt., from about 42% wt. to about 46% wt., from about 44% wt. to about 48% wt., from about 46% wt. to about 50% wt., from about 48% wt. to about 52% wt., from about 50% wt. to about 54% wt., from about 52% wt. to about 56% wt., from about 54% wt. to about 58% wt., from about 56% wt. to about 62% wt., from about 60% wt. to about 64% wt., from about 62% wt. to about 66% wt., from about 64% wt. to about 68% wt., from about 66% wt. to about 70% wt., from about 68% wt. to about 72% wt., from about 70% wt. to about 74% wt., from about 72% wt. to about 76% wt., from about 74% wt. to about 78% wt., and from about 76% wt. to about 80% wt. carbon.

The solid fuel composition may include from about 5% wt. to about 20% wt. hydrogen. The solid fuel composition may include from about 5% wt. to about 7% wt. hydrogen, from about 6% wt. to about 8% wt. hydrogen, from about 7% wt. to about 9% wt. hydrogen, from about 8% wt. to about 10% wt. hydrogen, from about 9% wt. to about 11% wt. hydrogen, from about 10% wt. to about 12% wt. hydrogen, from about 11% wt. to about 13% wt. hydrogen, from about 12% wt. to about 14% wt. hydrogen, from about 13% wt. to about 15% wt. hydrogen, from about 14% wt. to about 16% wt. hydrogen, from about 15% wt. to about 17% wt. hydrogen, from about 16% wt. to about 18% wt. hydrogen, from about 17% wt. to about 19% wt. hydrogen, and from about 18% wt. to about 20% wt. hydrogen.

The solid fuel composition may include from about 5% wt. to about 20% wt. oxygen. The solid fuel composition may include from about 5% wt. to about 7% wt. oxygen, from about 6% wt. to about 8% wt. oxygen, from about 7% wt. to about 9% wt. oxygen, from about 8% wt. to about 10% wt. oxygen, from about 9% wt. to about 11% wt. oxygen, from about 10% wt. to about 12% wt. oxygen, from about 11% wt. to about 13% wt. oxygen, from about 12% wt. to about 14% wt. oxygen, from about 13% wt. to about 15% wt. oxygen, from about 14 wt. to about 16% wt. oxygen, from about 15% wt. to about 17% wt. oxygen, from about 16% wt. to about 18% wt. oxygen, from about 17% wt. to about 19% wt. oxygen, and from about 18% wt. to about 20% wt. oxygen.

The solid fuel composition may include less than about 2% wt. sulfur. The solid fuel composition may include less than about 1% wt. sulfur, less than about 0.5% wt. sulfur, and less than about 0.1% wt. sulfur.

The solid fuel composition may include less than about 2% wt. chlorine. The solid fuel composition may include less than about 1% wt. chlorine, less than about 0.5% wt. chlorine, and less than about 0.1% wt. chlorine.

The solid fuel composition may include less than about 2% wt. water. The solid fuel composition may include less than about 1% wt. water, less than about 0.5% wt. water, and less than about 0.1% wt. water. The solid fuel composition may include less than about 1% wt. water.

The solid fuel composition, when burned, may release significantly lower levels of toxins compared to unprocessed solid waste. The amount of toxins released can and will vary. The solid fuel composition may release less than about 0.5 lb. alkali oxide, less than about 3 lb. ash, less than about 0.1 lb. sulfur dioxide ($SO_2$), and less than about 1.5 lb. of chlorine per million BTU when burned. The solid fuel composition may release less than about 0.5 lb. alkali oxide per million BTU when burned. The solid fuel composition may release less than about 3 lb. ash per million BTU when burned. The solid fuel composition may release less than about 0.1 lb. sulfur dioxide ($SO_2$) per million BTU when burned. The solid fuel composition may release less than about 1.5 lb. of chlorine per million BTU when burned.

The solid fuel composition may release an amount of ash ranging from between about 1 lb. and about 30 lb. per million BTU when burned, such as between about 1 lb. and 2 lb., between about 2 lb. and 3 lb., between about 3 lb. and 4 lb., between about 4 lb. and 5 lb., between about 5 lb. and 10 lb., between about 10 lb. and 15 lb., between about 15 lb. and 20 lb., between about 20 lb. and 25 lb., or between about 25 lb. and 30 lb.

The solid fuel compositions may be used as an engineered feedstock to replace or supplement coal, biomass or other alternative fuels during an incineration, pyrolysis or gasification process.

EXAMPLE

Ten tons of municipal solid waste is delivered. The MSW has a water content of about 20% wt. to about 40% wt. and comprises a variety of residential and commercial solid wastes, including an unknown amount of non-combustible solid waste and mixed plastics content. The MSW is screened for non-combustible solid waste. The non-combustible solid waste, including any glass, metal, bricks and stones, is removed. The MSW is then analyzed for its mixed plastics content. The amount of mixed plastics in the MSW is adjusted to between about 5% wt. and about 60% wt. Once the non-combustible solid waste is removed and the mixed plastics content is adjusted, the MSW is shredded to an average particle size equal to or less than other individual pieces within the MSW.

The shredded MSW is introduced into a process vessel as described herein. The MSW is heated to a temperature between about 90° C. and about 110° C. while mixing. This process separates the MSW into dried MSW and vaporized compounds, which include mostly water vapor and some volatile organic compounds that have a boiling point below about 110° C. The temperature of the MSW is maintained below about 110° C. so that the mixed plastics do not prematurely melt and trap water.

The vaporized compounds are removed from the process vessel by reducing the pressure within the process vessel to less than about 50 torr using a vacuum system attached at the vacuum port. A condenser between the process vessel and the vacuum pump of the vacuum system traps the vaporized compounds by condensing them into wastewater.

Within the process vessel, mixing continues while the vaporized compounds are removed under reduced pressure. The heat is then increased to between about 190° C. and about 260° C., melting the plastics within the dried MSW. The oil used to heat the walls of the process vessel can be up to 30° C. hotter than the interior volume of the process vessel, because the constant mixing evenly distributes heat throughout the MSW. The mixing process also further homogenizes the MSW. The temperature and pressure conditions are also sufficient to liberate further water not evaporated in the drying step and to liberate other VOCs. Moreover, these process conditions vaporize chlorinated organic compounds and chlorine gas derived primarily from chlorine containing plastics in the MSW, such as polyvinylchloride (PVC) and polyvinylidene chloride, These chlorinated organic compounds and chlorine gas also condense in the condenser, joining the wastewater there.

While still hot, but not above 200° C., the dried MSW containing molten mixed plastics is extruded through the extrusion outlet. As the MSW is extruded, it is cut into 2-inch long chucks. The extruded MSW is placed on a water-cooled conveyor where it is cooled to less than about 65° C., forming a solid fuel composition.

Based upon calorimetric analysis and density measurement, the solid fuel composition has an energy content of about 13,000 BTU/lb., and a density ranging of about 50 lb./ft³. Elemental analysis indicates that the resulting solid fuel has from about 60% wt. carbon, about 10% wt. hydrogen, about 10% wt. oxygen, less than about 2% wt. sulfur, less than about 2% wt. chlorine, and less than about 1% wt. water.

No syngas is formed during the process. The observed vaporized compounds are not the result of pyrolysis or gasification. Thus, the resulting solid fuel composition is not pyrolyzed.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method of producing a solid fuel composition, the method comprising:
    heating a solid waste mixture comprising between about 5% wt. and about 60% wt. mixed plastics within a process vessel to a temperature no greater than about 110° C. to separate the solid waste mixture into a dried solid waste mixture and vaporized compounds, wherein the dried solid waste mixture comprises less than 2% wt. water;
    removing the vaporized compounds from the process vessel;
    heating and mixing within the process vessel the dried solid waste mixture to at least 160° C. and below atmospheric pressure to form a heated dried solid waste mixture comprising melted mixed plastics;
    extruding the heated dried solid waste mixture below about 200° C. to produce an extruded solid waste mixture; and
    cooling the extruded solid waste mixture to less than about 65° C. to form the solid fuel composition, having an energy content of at least about 8,000 BTU/lb.

2. The method of claim 1, wherein the solid waste mixture comprises municipal solid waste and agricultural waste.

3. The method of claim 2, further comprising analyzing the solid waste mixture for non-combustible solid waste and, when present, removing the non-combustible solid waste.

4. The method of claim 2, further comprising analyzing the solid waste mixture for a mixed plastics content and, when necessary, adjusting the amount of mixed plastics in the solid waste mixture to between about 5% wt. an about 60% wt.

5. The method of claim 1, wherein the mixed plastics comprise one or more plastics selected from the group consisting of polyester, polyethylene terephthalate, polyethylene, polyvinyl chloride, polyvinylidene chloride, polypropylene, polystyrene, polyamides, acrylonitrile-butadiene-styrene, polyethylene/acrylonitrile-butadiene-styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethylmethacrylate, polytetrafluoroethylene, and urea-formaldehyde.

6. The method of claim 1, wherein the solid waste mixture comprises from about 5% wt. to about 35% wt. mixed plastics.

7. The method of claim 1, wherein the solid fuel composition comprises:
    from about 40% wt. to about 80% wt. carbon;
    from about 5% wt. to about 20% wt. hydrogen;
    oxygen;
    less than about 2% wt. sulfur; and
    less than about 2% wt. chlorine.

8. The method of claim 1, wherein the process vessel comprises one or more heated walls maintained at a wall temperature of at least about 190° C., a mixer in the interior volume of the process vessel and operatively connected to the process vessel, an extruding element passing through a first opening in the process vessel, and a vacuum port passing through a second opening in the process vessel; and wherein the process vessel is attached via the vacuum port to a vacuum system comprising a vacuum pump.

9. The method of claim 8, wherein the vacuum system comprises a condenser comprising an upper port, a lower port below the upper port, a condensate basin below the lower port, and a drain in the condensate basin, the condenser operatively coupled to the vacuum port of the process vessel via the upper port of the condenser, and the condenser operatively coupled to the vacuum pump via the lower port of the condenser.

10. The method of claim 9, further comprising removing the vaporized compounds via the vacuum port of the vacuum pump, the vaporized compounds comprising water vapor, volatile organic compounds, chlorinated organic compounds, chlorine gas, and any combination thereof.

11. The method of claim 1, further comprising shredding the solid waste mixture into pieces having a maximum dimension or maximum diameter of about two inches prior to introducing the solid waste mixture into the process vessel.

12. A method of producing a solid fuel composition, the method comprising:
    adjusting an amount of mixed plastics in a solid waste mixture to between about 5% wt. and about 60% wt.;
    shredding the solid waste mixture to reduce particle sizes equal to or less than other individual pieces within the solid waste mixture;
    introducing the solid waste mixture into a process vessel, the process vessel comprising one or more heated walls maintained at a wall temperature between about 190° C. and about 260° C., a mixer operatively connected to the process vessel, an extruding element passing through a first opening in the process vessel, and a vacuum port passing through a second opening in the process vessel;
    heating within the process vessel the solid waste mixture to a temperature between about 90° C. and about 110° C. to separate the solid waste mixture into a dried solid waste mixture and vaporized compounds, comprising water vapor, volatile organic compounds, chlorinated organic compounds, chlorine gas, and any combination thereof, wherein the dried solid waste mixture comprises less than 2% wt. water;
    removing the vaporized compounds from the process vessel by reducing the pressure within the process vessel to less than about 50 torr using a vacuum system attached at the vacuum port;
    heating and mixing within the process vessel the dried solid waste mixture to between about 190° C. and about 260° C. and at less than about 50 torr to form a heated dried solid waste mixture comprising melted mixed plastics;
    extruding the heated dried solid waste mixture from the process vessel at temperature below about 200° C. using the extrusion outlet to produce an extruded solid waste mixture; and
    cooling the extruded dried solid waste mixture to less than about 65° C. to form the solid fuel composition, having an energy content of at least about 8,000 BTU/lb.

13. The method of claim 12, wherein the solid waste mixture comprises municipal solid waste and agricultural waste.

14. The method of claim 12, wherein the mixed plastics comprise one or more plastics selected from the group consisting of polyester, polyethylene terephthalate, polyethylene, polyvinyl chloride, polyvinylidene chloride, polypropylene, polystyrene, polyamides, acrylonitrile-butadiene-styrene, polyethylene/acrylonitrile-butadiene-styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethylmethacrylate, polytetrafluoroethylene, and urea-formaldehyde.

15. The method of claim 12, further comprising heating the solid waste mixture by heat transfer from the one or more heated walls until the solid waste mixture attains a temperature less than about 30° C. below the wall temperature.

16. The method of claim 12, further comprising shredding the solid waste mixture into pieces having a maximum dimension or a maximum diameter of about two inches prior to introducing the solid waste mixture into the process vessel.

17. The method of claim 12, further comprising condensing the vaporized compounds removed from the process vessel to produce wastewater comprising one or more compounds selected from the group consisting of volatile organic compounds, chlorinated organic compounds, chlorine gas, and any combination thereof.

18. The method of claim 17, further comprising removing the one or more compounds from the wastewater to produce treated wastewater.

19. The method of claim 17, further comprising maintaining the wall temperature at about 280° C. and heating the solid waste mixture to about 250° C. to soften and disperse the mixed plastics within the heated solid waste mixture.

20. The method of claim 12, further comprising monitoring the wall temperature of the one or more heated walls and using the monitored wall temperature to modulate operation of a heater operatively coupled to the one or more heated walls to automatically maintain the one or more heated walls at a desired wall temperature.

21. The method of claim 12, further comprising monitoring a headspace pressure within a headspace volume within the process vessel and using the monitored headspace pressure to modulate operation of the vacuum system to automatically maintain the reduced pressure within the process vessel.

22. The method of claim 12, further comprising monitoring a moisture content within the vaporized compounds removed from the process vessel to determine whether the solid waste mixture is sufficiently heated to release water vapor.

23. The method of claim 12, further comprising monitoring a mixture temperature within the dried solid waste mixture within the process vessel to determine whether the solid waste mixture is ready for extrusion from the process vessel.

24. The method of claim 12, further comprising monitoring a weight of the solid waste mixture within the process vessel to determine whether the vaporized compounds are removed from the solid waste mixture.

25. The method of claim 12, further comprising heating and mixing the solid waste mixture for a predetermined duration ranging from about 0.5 hours to about 2 hours.

26. The method of claim 12, further comprising cutting the extruded mixture into pieces during cooling.

27. The method of claim 12, where the solid fuel composition comprises:
from about 40% wt. to about 80% wt. carbon;
from about 5% wt. to about 20% wt. hydrogen;
oxygen;
less than about 2% wt. sulfur; and
less than about 2% wt. chlorine.

28. The method of claim 12, further comprising analyzing the solid waste mixture for presence of non-combustible solid waste and, when present, removing the non-combustible solid waste.

29. The method of claim 12, further comprising analyzing the solid waste mixture for a mixed plastics content to determine the adjusting of the amount of mixed plastics in the solid waste mixture.

30. A method, comprising:
heating within a process vessel a solid waste composition comprising one or more plastics in an amount of about 5% wt. to about 60% wt. of the solid waste composition;
separating vaporized compounds from the solid waste composition;
melting within the process vessel the one or more plastics of the solid waste composition, wherein the solid waste composition comprises less than 2% wt. water;
extruding at least a portion of the solid waste composition to produce an extrudate; and
cooling the extrudate to form a solid fuel composition having an energy content of at least about 8,000 BTU/lb.

* * * * *